United States Patent [19]

Sindhu

[11] Patent Number: 5,230,045
[45] Date of Patent: * Jul. 20, 1993

[54] MULTIPLE ADDRESS SPACE SYSTEM INCLUDING ADDRESS TRANSLATOR FOR RECEIVING VIRTUAL ADDRESSES FROM BUS AND PROVIDING REAL ADDRESSES ON THE BUS

[75] Inventor: Pradeep S. Sindhu, Mountain View, Calif.

[73] Assignee: Xerox Corporation, Stamford, Conn.

[ * ] Notice: The portion of the term of this patent subsequent to Jun. 16, 2009 has been disclaimed.

[21] Appl. No.: 864,982

[22] Filed: Apr. 7, 1992

Related U.S. Application Data

[60] Division of Ser. No. 399,417, Aug. 23, 1989, Pat. No. 5,123,101, which is a continuation of Ser. No. 929,579, Nov. 12, 1986, abandoned.

[51] Int. Cl.⁵ .................... G06F 12/10; G06F 12/08; G06F 12/00
[52] U.S. Cl. .................... 395/425; 395/400; 364/256.3; 364/256.4; 364/256.5; 364/DIG. 1; 364/935.4; 364/961.4
[58] Field of Search ................ 395/400, 425

[56] References Cited

U.S. PATENT DOCUMENTS

| | | | |
|---|---|---|---|
| 4,145,738 | 3/1979 | Inoue et al. | 395/400 |
| 4,473,878 | 9/1984 | Zolnowsky et al. | 395/400 |
| 4,481,573 | 11/1984 | Fukunaga et al. | 395/400 |
| 4,495,575 | 1/1985 | Eguchi | 395/400 |
| 4,513,371 | 4/1985 | Celio | 395/400 |
| 4,654,777 | 3/1987 | Nakamura | 395/400 |
| 4,694,395 | 9/1987 | Young et al. | 395/425 |
| 4,727,486 | 2/1988 | Smith et al. | 395/425 |
| 4,774,653 | 9/1988 | James | 395/400 |
| 5,029,072 | 7/1991 | Moyer et al. | 395/425 |
| 5,123,101 | 6/1992 | Sundhu | 395/400 |

*Primary Examiner*—Thomas C. Lee
*Assistant Examiner*—Paul Harrity

[57] ABSTRACT

Virtual addresses from multiple address spaces are translated to real addresses in main memory by generating for each virtual address an address space identifier (AID) identifying its address space. Then, the virtual address and its AID are used to obtain the real address. The address spaces include a shared address space, from which the processor can provide a virtual address at any time, as well as switched address spaces, from one of which the processor can provide a virtual address at a given time. If the processor's local cache does not have data for the virtual address and cannot translate the virtual address to a real address, the local cache provides the virtual address on a bus. A dedicated VLSI map cache is connected for receiving virtual addresses from the bus and for providing real addresses on the bus. The bus is also connected for providing real addresses to access memory. The map cache, which can handle address translation for multiple processors connected to the bus, translates by keeping the most recently accessed mapping entries, each of which associates a virtual address and its AID with a real address. If the virtual address is from the shared address space, the map cache uses the shared AID, but if not, the map cache uses the current switched AID for the processor providing the virtual address.

10 Claims, 9 Drawing Sheets

MULTIPLE ADDRESS SPACE SYSTEM INCLUDING ADDRESS TRANSLATOR FOR RECEIVING VIRTUAL ADDRESSES FROM BUS AND PROVIDING REAL ADDRESSES ON THE BUS

This is a division of application Ser. No. 07/399,417, filed Aug. 23, 1989, now U.S. Pat. No. 5,123,101, which was a continuation of application Ser. No. 06/929,579, filed Nov. 12, 1986, now abandoned.

BACKGROUND OF THE INVENTION

The present invention relates to address mapping techniques which may be used with multiple address spaces. More specifically, the invention relates to an arrangement in which a processor is connected to a main memory and can access data from a real address in main memory by generating a virtual address from one of a plurality of address spaces.

In a conventional multiple address space system, a processor cannot operate in more than one address space at a time, but a processor is capable of operating in one of a number of the multiple address spaces. Furthermore, in a multiprocessor, with several processors operating simultaneously, different processors may be operating in different address spaces at one time.

Multiple address spaces are conventionally implemented by providing a separate mapping table for mapping the virtual addresses in each address space into corresponding real addresses. Due to their size, these mapping tables are stored in main memory or secondary memory, so that accessing them is slow. In order to avoid accessing the appropriate mapping table for each virtual address generated by a processor, a translation lookaside buffer containing the most frequently used mapping table entries is located in the processor or its cache memory. Typically, the processor converts a virtual address to a real address, using the translation lookaside buffer or the mapping table if necessary, before feeding the address to its cache, resulting in delay. Additional delay occurs when accessing the mapping table in main or secondary memory, which will occur very frequently whenever a processor changes from operating in one address space to another and less frequently at other times.

U.S. Pat. No. 4,481,573 discusses a virtual address translation unit which is shared by plural processors, one of which is connected to a common bus through a cache. Rather than providing a translation lookaside buffer in each processor, a translation lookaside buffer is provided in the address translation unit shared by all the processors. Therefore, the virtual address is fed directly to the cache, and is only translated when a cache miss occurs, avoiding delays due to translation. This patent does not, however, discuss the use of multiple address spaces.

U.S. Pat. No. 4,264,953 illustrates another approach to virtual address translation, in which each cache responds to virtual addresses in parallel with a mapper which translates the virtual addresses from that cache's multiprogrammed processor. The mapper may translate a virtual address into different real, or physical, addresses when its processor is running different programs, and some of the real addresses access a shared portion of main memory. In order to avoid consistency problems, the caches never store data from the shared portion of memory. To increase efficiency, each cache has a portion dedicated to each operating program so that it is not necessary to reload the entire cache when a processor changes from executing one program to another. Each processor sends both a virtual address and an identifying program number to its mapper in order to produce a physical address appropriate to the program it is running. This mapping of addresses based on which program is running may be thought of as an example of multiple address spaces. In effect, the only address space available to a processor at any given time is the one corresponding to the program it is running. The shared portion of memory is included in every address space, but the mapper recognizes addresses in the shared portion of memory somehow and inhibits the cache from storing data from that portion. This technique thus permits sharing only within a predetermined portion of memory, and precludes the cache storage of shared data.

Goodman, J. R., "Using Cache Memories to Reduce Processor-Memory Traffic", 10th Annual Symposium on Computer Architecture, Trondheim, Norway, (June 1983), discusses early work on what is now known as a "snoopy cache", used with a processor which is connected to the main memory through a bus which supports multiple processors. A snoopy cache may be used to increase system performance where processor-memory bandwidth is severely limited. Goodman recognizes the difficulty of task switching, which requires cache reloading, and suggests using a separate processor for each task. This paper does not deal with the issue of address translation and therefore does not discuss multiple address spaces.

Katz, R. H., Eggers, S. J., Wood, D. A., Perkins, C. L. and Sheldon, R. G., "Implementing a Cache Consistency Protocol", *Conference Proceedings: The 12th Annual International Symposium on Computer Architecture*, IEEE Computer Society Press, Piscataway, N.J., 1985, pp. 276-283, discuss a cache consistency protocol for use in a shared memory multiprocessor system including snoopy caches, but similarly does not deal with the issues of address translation and multiple address spaces.

Thakkar, S. S., and Knowles, A. E., "A High-Performance Memory Management Scheme", *Computer*, May 1986, pp. 8-19 and 22, discuss a number of conventional techniques for mapping virtual to real addresses. For example, the virtual address space can be divided into segments, and a segmented virtual address space could be provided for each process, with each virtual address including a process number field. Thakkar et al. discuss a segmented, paged virtual address space for each process in relation to the MUSS operating system, with a shared segment of the virtual address space of each process being accessible through a common segment table. Thakkar et al. also discuss DEC's VAX 11/780 system in which the virtual address divides the address space into system and user regions, selectable by the most significant virtual address bits, with a separate page table in main memory for each region. In this system, the entire page table need not be allocated in memory if it is not used, because its length is stored. Also, Sun Microsystem's Sun workstation performs address translation for a process by accessing the segment and page tables for that process in a high-speed memory. Thakkar et al. also discuss the MU6-G in which the page table size was reduced to cover only those pages currently resident in main memory, with a hardware page address register (PAR) being provided for every page in main memory. Although sharing of segments between all processes was possible with this technique, segments could not be shared between selected processes. In short, the prior art techniques described by Thakkar et al. do not provide flexible access to shared data.

It would be advantageous to have a space and time efficient address translation technique for use with multiple address spaces which would permit flexible access to shared data.

SUMMARY OF THE INVENTION

The present invention provides address translation techniques which are simple and fast and which use a relatively small portion of main memory. The techniques according to the invention can translate virtual addresses from multiple address spaces including shared data. The techniques may be used with a single compact map table in main memory.

One aspect of the invention is based on the recognition that, for purposes of translation, each of the multiple address spaces may be identified by an address space identifier which, together with one of the set of virtual addresses for that address space, is sufficient to identify a data item accessible from that address space. Therefore, by generating an appropriate address space identifier, a processor may at any given time provide virtual addresses from any of the multiple address spaces; may change from one to another of the multiple address spaces within a program; and may share data in one of the multiple address spaces with other processors in a shared memory multiprocessor. This aspect of the invention is further based on the discovery that translation of virtual addresses from such multiple address spaces can be implemented by using the virtual address in generating an address space identifier which, together with the virtual address, is used to obtain a real address.

A related aspect of the invention is based on the recognition that multiple address spaces according to the invention may include a group of switched address spaces and at least one shared address space. A virtual address may only be translated from a switched address space in response to a processor operating in that switched address space. But a virtual address may be translated from a shared address space regardless of the switched address space in which a processor is operating. Therefore, shared data may be accessed by a number of processors in a shared memory multiprocessor through a shared address space even though each processor is operating in a different switched address space.

This aspect of the invention may be implemented by defining two mutually distinct sets of virtual addresses, a shared virtual address set and a switched virtual address set. If a virtual address is in the shared virtual address set, a shared address space identifier is generated for mapping from a shared address space. But if the virtual address is in the switched virtual address set, a processor identifier identifying the processor which provided the virtual address is used to generate a switched address space identifier for mapping from one of the switched address spaces for that processor. The processor identifier may be applied to a lookup table to generate a switched address space identifier.

The virtual addresses in the switched and shared virtual address sets are mapped using stored entries, each entry associating an address space identifier and virtual address with a real address. But if the virtual address is in a set of bypass virtual addresses, it is algorithmically mapped into a real address in a bypass area of main memory regardless of whether it is also in the shared or switched virtual address set. The bypass virtual address set is thus independent of and may overlap the shared and switched virtual address sets.

The address translation technique of the present invention may be implemented with an address translation apparatus referred to herein as a map cache. The map cache is accessed upon the occurrence of a processor cache miss. As its name suggests, the map cache may respond by performing a mapping or address translation function and a cache function. For performing the mapping function, the map cache includes means for using a virtual address in generating an address space identifier identifying one of the multiple address spaces and means for obtaining a real address using the address space identifier and virtual address. This aspect of the invention is thus also based on the discovery that the virtual address can be tested, decoded or otherwise used in generating an address space identifier identifying the address space from which to translate it.

As noted above, the map cache also performs a cache function, meaning that it stores the most frequently used mapping entries. Therefore, when address translation is necessary, it is performed far more efficiently than if it were necessary to access the map table in main memory. This aspect of the invention is based on the discovery that a single mapping cache memory can be used to perform the address translation function for all the address spaces if each stored entry includes an address space identifier and virtual address associated with a real address. The mapping cache memory thus returns the real address when it receives the address space identifier and virtual address of a stored entry, but if the received address space identifier and virtual address are not in one of the stored entries, it signals a miss.

When a map cache miss occurs, the processor whose local cache requested map cache service executes appropriate software to retrieve the requested entry from main memory and loads it into the map cache. Similarly, if the map table in main memory requires servicing as the result of a map cache miss, the same processor services the map table by executing appropriate software. As a result, the manner in which map cache misses are handled and the structure of the map table are not fixed in hardware, but can be modified to enhance function or performance by changing software. This aspect of the invention is based on the recognition that control of the map cache and map table need not be linked to specific hardware, and that only some of the features need be implemented in hardware to obtain the desired speed of operation.

In mapping a virtual address, the map cache tests the virtual address to determine whether it lies in the set of bypass virtual addresses. The bypass virtual address set corresponds to real addresses which access a bypass area in memory. This bypass area contains the map table and the software for servicing map cache misses as discussed above. The bypass area generally contains data during the access of which a map cache miss should not occur. If a virtual address is in the bypass virtual address set, the map cache obtains a real bypass area address algorithmically based on the virtual address rather than by using the address space identifier and virtual address. The bypass area thus ensures that a processor will not encounter a map cache miss while handling a map cache miss, because the bypass area translation process does not involve entering the map cache's mapping cache memory and therefore cannot lead to a map cache miss.

Some shared data in memory is accessed from a separate shared address space with a corresponding shared address space identifier. A processor's virtual addresses will ordinarily be translated from a switched address space using a switched address space identifier. But if a virtual address indicates that the shared address space identifier should be used, translation proceeds without regard to the switched address space. Therefore, data accessible using the shared address space identifier is available to all processors, despite their different switched address spaces. In addition, the map cache can provide sharing by a subset of the processors by translating virtual addresses from different switched address spaces to the same real address.

According to another aspect of the invention, the map table contains translation information about every page currently in main memory, including those which are in more than one address space. Pages only present in secondary memory are not represented in the map table, but at least some pages which are present correspond to more than one virtual address and respective address space identifier. Therefore, when a map table miss is detected and a page is loaded into the paged area, the map table is updated so that it continues to include only entries for pages in the paged area and may include more than one entry for pages shared between address spaces. More specifically, the map table is updated to include an entry for each virtual address and respective address space identifier which corresponds to a page in the paged area. The resulting map table is relatively small, occupying a fixed fraction which may be less than 1% of main memory. It is structured as a hash table indexed by hashing a virtual address and respective address space identifier. This aspect of the invention is based on the recognition that a map table which only contains entries for pages in memory can be used even if data is shared between address spaces if the map table can include more than one entry for a page. Furthermore, if the map table contains an entry for every virtual address and respective address space identifier corresponding to a page in main memory, a map table miss will only occur when that page is not in main memory. Therefore, a map table miss will always mean that a page fault has occurred, so that a page must be loaded from secondary memory. Thus, the size of main memory will bear directly on the frequency of map table/page faults and on the speed of translation.

These and other objects, features and advantages of the invention will be understood more fully from the following description together with the drawings and claims.

DETAILED DESCRIPTION OF THE PREFERRED EMBODIMENTS

1. General Description

Figure 1:
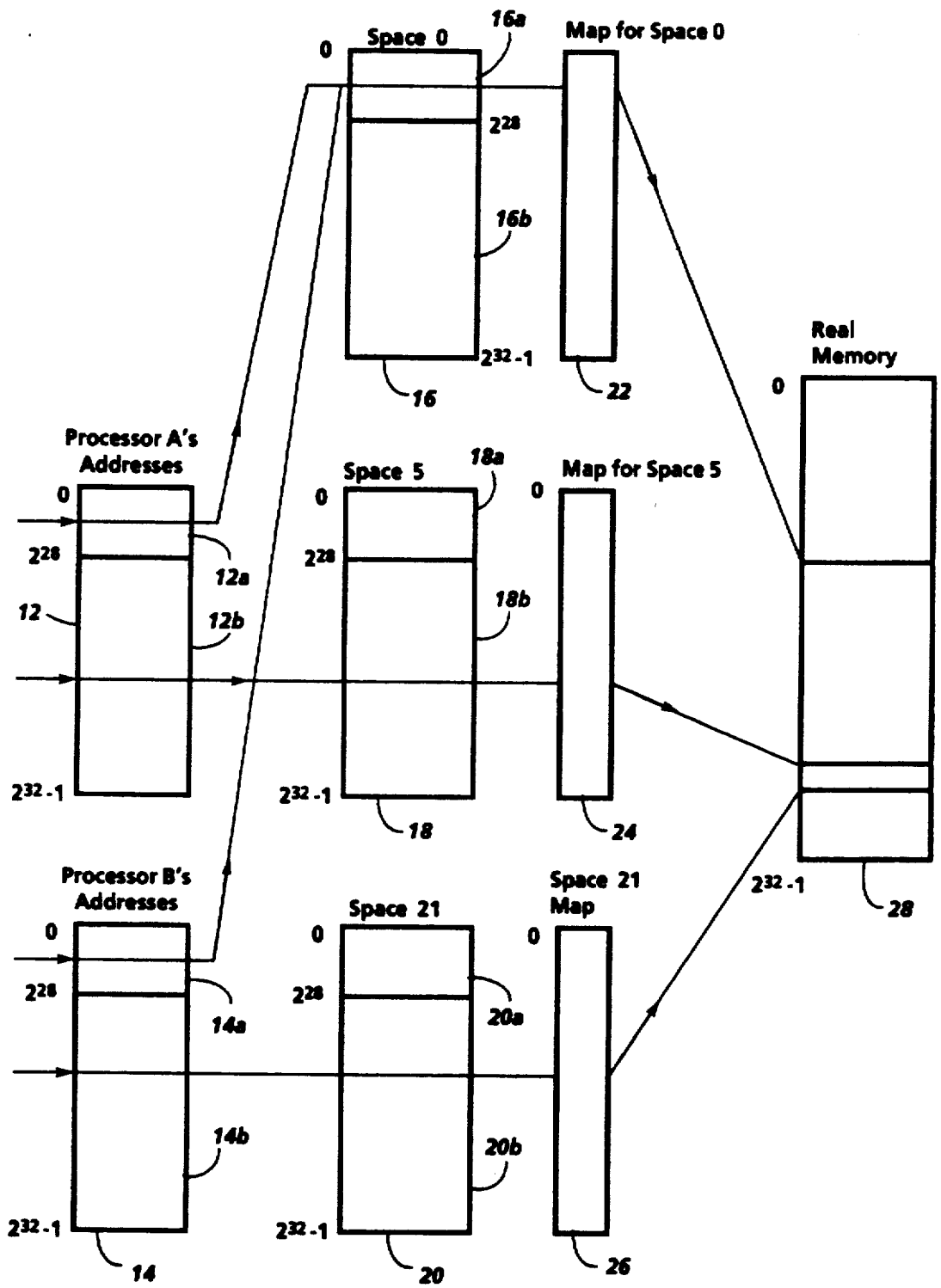
FIG. 1 is a schematic diagram illustrating the mapping of virtual addresses from multiple address spaces into real memory addresses according to the invention.

FIG. 1 illustrates a technique for providing multiple address spaces according to the invention in a shared memory multiprocessor. At the left in FIG. 1 are processor address ranges 12 and 14, the address ranges of processors A and B, respectively. Each processor address range includes all the virtual addresses which may be generated by the respective processor. For illustration, processor address ranges 12 and 14 are each shown having $2^{32}$ addresses, with the first $2^{28}$ addresses of each range being treated differently than the remainder.

In the middle of FIG. 1 are address ranges 16, 18 and 20, showing the ranges of virtual addresses which occur in three address spaces, designated Space 0, Space 5 and Space 21, respectively. Maps 22, 24 and 26 are the respective maps for Space 0, Space 5 and Space 21. As shown in FIG. 1, virtual addresses from processor A may be translated using map 22 for Space 0 or map 24 for Space 5, while virtual addresses from processor B may be translated using map 22 for Space 0 or map 26 for Space 21. The result of a translation using any of the maps is a real address in the real address range 28.

FIG. 1 thus illustrates conceptually the role an address space plays in translating a virtual address to a real address according to the invention. The address space itself is a set of virtual addresses, each of which is unique. A single virtual address may be translated to a number of different real addresses if it is translated from different address spaces, but within any one address space, that virtual address will be translated to only one real address. Therefore, each virtual address, when combined with data uniquely identifying its respective address space, is sufficient to obtain the corresponding real address for accessing main memory.

An address space could also be thought of as defining the manner or map according to which a virtual address is translated into a real address. One aspect of the invention, however, is based on the recognition that the mapping of virtual addresses into real addresses in main memory, even where data is shared between address spaces, only requires mapping entries for the data currently present in main memory, provided that it is possible to have more than one mapping entry for the shared data.

The features shown in FIG. 1 correspond to states and operations of one or more processors and a translating apparatus. An address space of the type illustrated in FIG. 1 can therefore also be thought of as a state of a translating apparatus which determines how a virtual address will be translated into a real address. The address space state of the translating apparatus is not determined soley by the processor which generated the virtual address. For example, if processor A provides a virtual address, the translating apparatus may either be in Space 0 or Space 5. As discussed in more detail below, the virtual address which processor A generates can determine the address space used in its translation.

Space 0 is a shared address space, while Space 5 is a switched address space, so designated because processor A may be changed or switched to a different switched address space. Each processor thus has a state which determines in which switched address space or spaces it is operating. In the embodiments described below, each processor can operate in at most one switched address space at a time, although its virtual addresses can access a shared address space like Space 0 at any time. Alternatively, each processor could operate in more than one switched address space by suitable modification. Similarly, more than one shared address space could be provided. The manner in which a processor may change from one switched address space to another is discussed in more detail below.

As shown in FIG. 1, if the virtual address from a processor is in a shared address range 12a or 14a, illustratively occupying the first 228 words of each processor address range, the translating apparatus will translate in Space 0, the shared address space, and, more specifically, in the addressable part 16a of Space 0 which corresponds to the first 228 words of its address space range 16. If the virtual address is in a switched address range 12b or 14b, however, the translating apparatus will translate in the switched address space in which the processor is currently operating, and, more specifically for the example of FIG. 1, in the addressable part 18b or 20b of the address space range of Space 5 or Space 21, respectively. Therefore, the address space ranges of Spaces 0, 5 and 21 have non-addressable parts 16b, 18a and 20a including the addresses other than those in addressable parts 16a, 18b and 20b, respectively.

Figure 2:
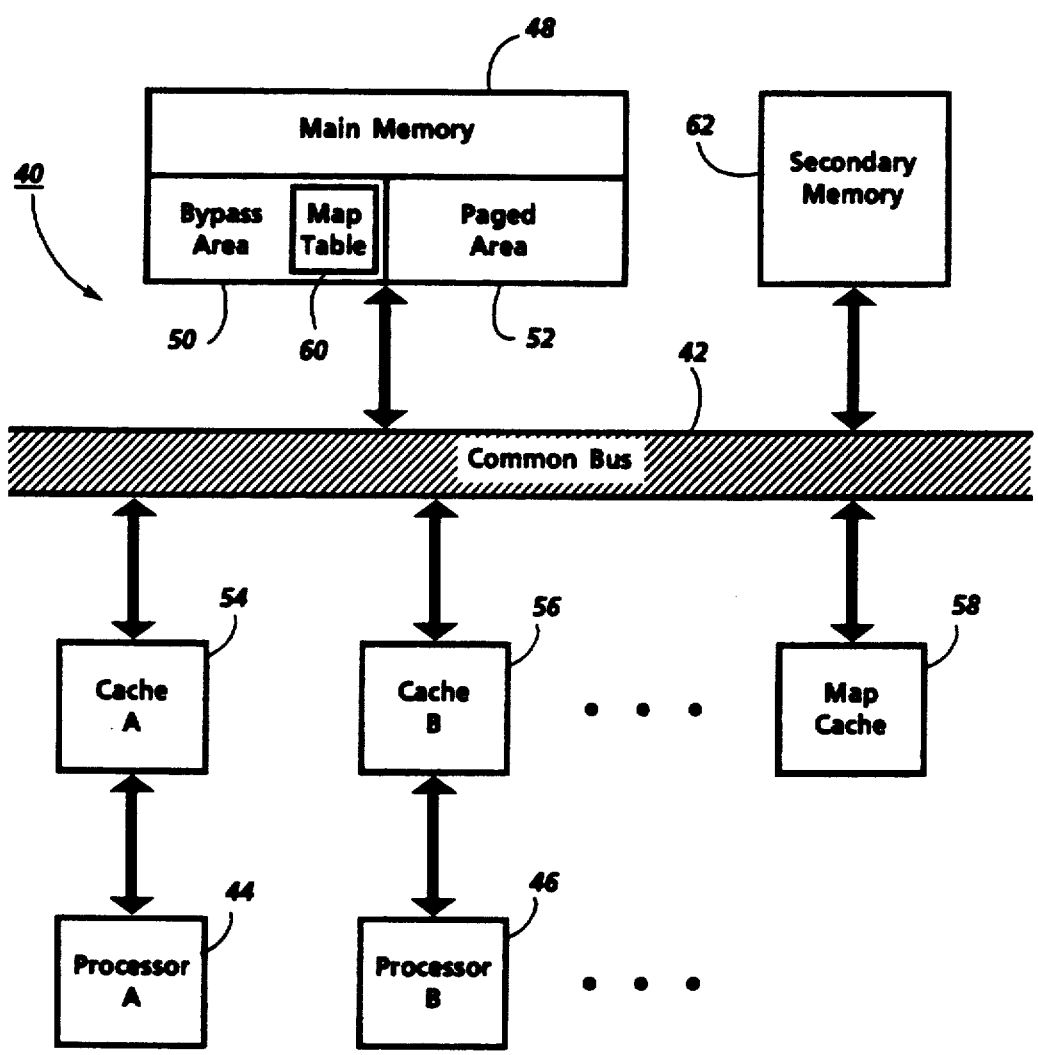
FIG. 2 is a schematic block diagram showing a shared memory multiprocessor system with translating apparatus according to the invention.
Figure 3:
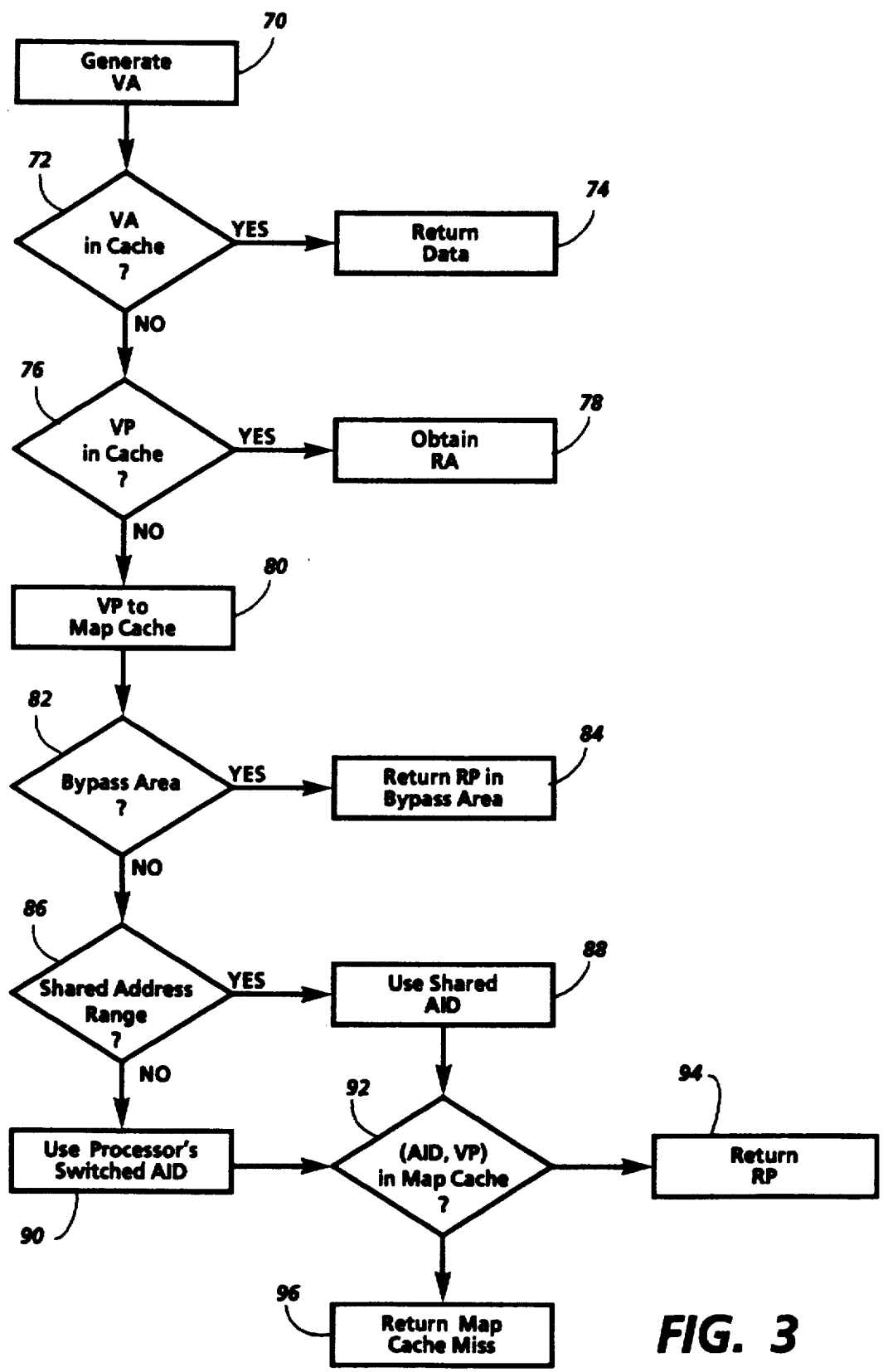
FIG. 3 is a flow chart illustrating the operation of the components of the system of FIG. 2.

The features described above in relation to FIG. 1 could be implemented in many ways. FIG. 2 shows an exemplary shared memory multiprocessor system 40 in which translating apparatus is used to perform translation according to the invention. FIG. 3 illustrates exemplary operation of the components shown in FIG. 2 in performing translation according to the invention.

System 40 in FIG. 2 is built around a communication link such as common bus 42 which connects the other components of system 40. Any suitable link can be used for this purpose, provided it is capable of handling the communications between the other components as described below. System 40 also includes a plurality of processors, including Processor A 44 and Processor B 46, each of which executes instructions and performs operations on data from main memory 48. Main memory 48 thus stores instructions and data, but preferably includes two areas bypass area 50 and paged area 52, in order to implement some features according to the invention. In accessing an instruction or data from main memory 48, each processor will generate a virtual address which is translated into a real address at which the instruction or data is stored in main memory 48.

Rather than being directly connected to common bus 42, processors 44 and 46 are connected through Cache A 54 and Cache B 56, respectively. Caches 54 and 56 may generally be conventional caches, so that once they are loaded, processors 44 and 46 will each operate from the respective cache unless an instruction or data is required which is not stored in the respective cache. Caches 54 and 56, for example, may each be a cache memory of the type which receives a virtual address from a processor and returns data corresponding to that virtual address if stored in the cache. But if the data is not stored in the cache, a local cache miss occurs and the missed virtual address is translated into a real address which is then used in retrieving the data from main memory 48 to be loaded into the cache for subsequent access by the processor.

The primary function of map cache 58 is to translate a virtual address into a real address. Map cache 58 is a novel component which may also, as discussed in detail below, perform a number of other ancillary functions. When a local cache miss occurs for any of the processors in system 40, the virtual address which missed is sent to map cache 58. Map cache 58 attempts to translate the virtual address and, if successful, returns the corresponding real address to be used in accessing main memory 48. But if map cache 58 is not successful, a map cache miss occurs and a map table 60 in bypass area 50 is accessed to find the corresponding real address in paged area 52. If this is also unsuccessful, a page containing the instruction or data sought is retrieved from secondary memory 62, such as disk memory, and loaded into paged area 52 so that the translation can proceed.

FIG. 3 illustrates in more detail how the components shown in FIG. 2 may operate. One of the processors 44, 46 serves as means for generating a virtual address and begins an address translation operation by generating a virtual address (VA) and sending it to its respective cache 54, 56, as shown in box 70. The cache determines whether the virtual address is one of the addresses for which it is storing the data from memory, in box 72. If so, the data from the cache is returned to the processor in box 74, and no translation is necessary.

If a cache miss occurs, the cache first determines in box 76 whether a partial virtual address referred to herein as a virtual page address (VP) is available from one of the entries it is storing. If so, the cache uses the VP to obtain a real address (RA) in box 78, in the manner described in copending coassigned U.S. patent application Ser. No. 930,172, now issued as U.S. Pat. No. 4,843,542, incorporated herein by reference.

When the cache is unable to return data or to obtain the real address itself, it provides VP to the map cache, as shown in box 80. Then the map cache begins address translation, initially testing in box 82 whether VP is one of the virtual addresses which access bypass area 50. As explained in greater detail below, bypass area 50 contains instructions and data which are accessed by a processor in the event of a map cache miss, which will occur if map cache 58 does not contain the necessary information to translate a virtual address generated by that processor. Therefore, in order to avoid a map cache miss during the handling of a map cache miss, the processors must be able to access the bypass area at all times. If VP is a bypass area address, map cache 58 operates in box 84 to determine the corresponding real page address (RP) in bypass area 50, and returns RP to the processor.

If VP is not a bypass area address, map cache 58 continues by testing in box 86 whether VP is in the shared address range, such as ranges 12a and 14a in FIG. 1. This test determines in which of the address spaces the translation will be performed. If VP is in the shared address range, map cache 58 enters the shared address space, shown as Space 0 in FIG. 1. As shown in box 88, this means that a shared address space identifier (AID) is used corresponding to Space 0. But if VP is in the switched address range, such as ranges 12b and 14b in FIG. 1, a switched AID is used as shown in box 86, corresponding to the switched address space in which the requesting processor is currently operating, such as Space 5 or Space 21 in FIG. 1.

When the address space identifier has been chosen, map cache 58 proceeds to determine whether it can translate the pair (AID, VP) by applying them to its internal mapping memory, containing entries each of which associates an (AID, VP) pair with a real page address (RP). If (AID, VP) is present, the corresponding RP is returned to the processor for further operations in box 94. Otherwise, a map cache miss occurs in box 96, and is signaled to the processor, which proceeds by generating a virtual address in bypass area 50 to retrieve an instruction for handling the map cache miss, as discussed in greater detail below.

The implementation shown in FIG. 2, whose operation is shown in FIG. 3, contains a number of components which operate conventionally for the most part, including processors 44, 46, common bus 42 and secondary memory 62. Main memory 48 is similarly conventional, although the contents of bypass area 50 are not. We turn now to the relevant details of map cache 58, of caches 54 and 56 and the contents of bypass area 50.

2. Map Cache

Map cache 58 accelerates the translation of virtual addresses for all the processors in system 40. If a virtual address is one of those translatable by map cache 58, a requesting processor need not access the map table in main memory 48 to retrieve a real address. Map cache 58 is capable of translating the virtual address much more rapidly, being preferably designed to perform translations as rapidly as practical.

Figure 4:
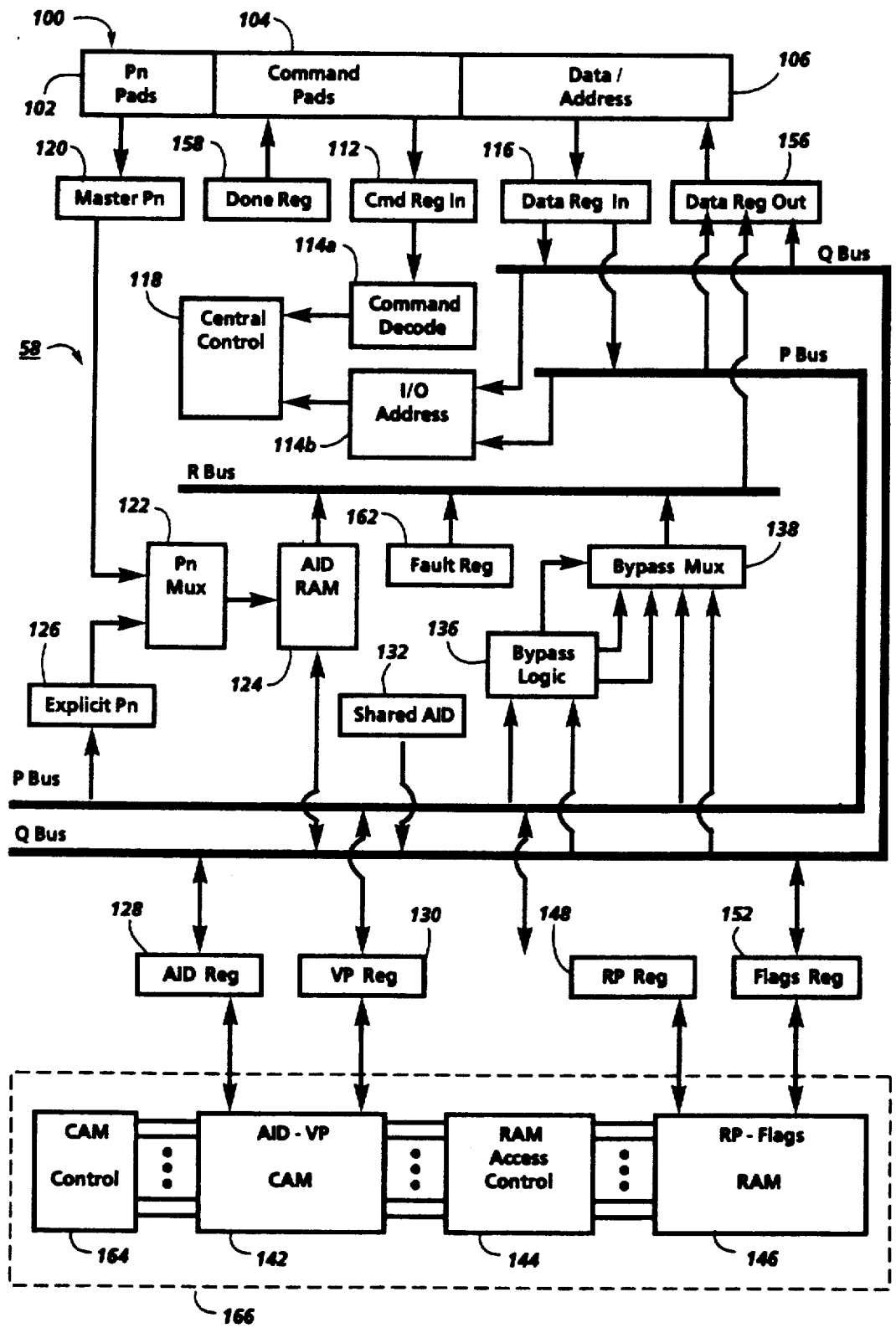
FIG. 4 is a schematic block diagram showing in more detail the map cache of FIG. 2.

FIG. 4 is a schematic block diagram of the major functional components of one implementation of map cache 58. The components shown in FIG. 4 are preferably all included in a single VLSI circuit to increase speed of translation.

Map cache 58 includes pads 100 for connecting to bus 42. Additional pads may be necessary for system requirements, such as parity pads, according to conventional techniques. Processor number pads 102 receive the number of the processor which is currently requesting translation or which is accessing map cache 58 for another purpose. Command pads 104 receive a command from such a processor and are also used in sending a response. Data/address pads 106 receive data and addresses related to the command received by command pads 104 and are also used to send data and addresses back to a processor over bus 42.

The operations of map cache 58 in the implementation of FIG. 4 are controlled by the commands received through command pads 104. The commands are automatically stored in a register CmdRegIn 112 and decoded by command decode logic 114a. Command decode 114a will indicate to central control logic 118 which command has been received if the received command is one of those requiring action by map cache 58. Central control 118 will then control the other components of map cache 58 to perform the appropriate response to the command received. For some commands, the determination of whether or how an operation is to be performed may depend on an address received on data/address pads 106 and automatically stored in a register DataRegIn 116. If so, central control 118 also receives an indication of the result of decoding that data from I/O address decode 114b. For example, address decode 114b may signal that a virtual address in DataRegIn 116 is in the shared address space range discussed above in relation to FIG. 1, which will determine which operations are done by central control 118. Thus address decode 114b serves as means for determining from a virtual address whether to generate a switched or shared address space identifier.

Central control 118 is connected to the other components of map cache 58 by conventional control lines (not shown). The logic of central control 118 can take any form capable of implementing the operations described below. For example, it could be an appropriately programmed programmable logic array (PLA) that has feedback paths.

Map cache 58 responds to two broad categories of commands, translation commands and servicing commands. A translation command includes a virtual address to be translated, and will be designated as ReadMap herein. The various servicing commands are used to manipulate the contents of map cache 58 during initialization, during map cache miss handling, and during certain other operations involving map cache 58. A number of exemplary servicing commands are described below.

Figure 5:
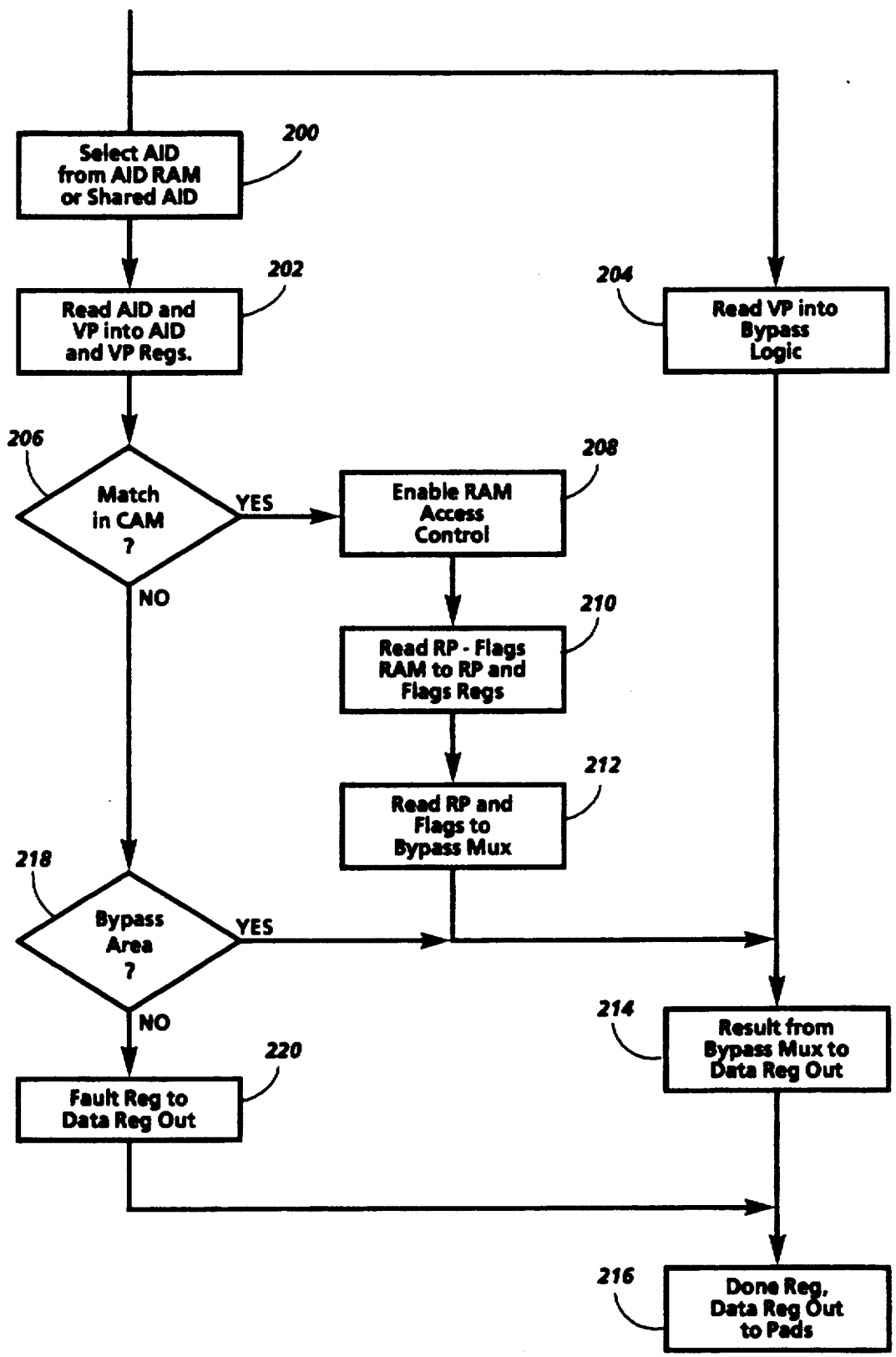
FIG. 5 is a flow chart illustrating a translation operation of the map cache of FIG. 4.

The operation of map cache 58 and the structure of most of its components can be understood most clearly by following the sequence of operations invoked by central control 118 upon receiving a ReadMap command. FIG. 5 shows an exemplary sequence of operations, some of which are performed in parallel. Before the operations of FIG. 5 can be performed, however, a command received on the command pads 104 is automatically latched or stored in CmdRegIn 112. Command decode 114a identifies the value from CmdRegIn 112 as the ReadMap command and provides a corresponding signal to central control 118. Also, a virtual address received on data/address pads 106 is automatically latched in DataRegIn 116 and I/O address decode 114b determines whether it is in the shared address space range. If so, address decode 114b signals central control 118 accordingly.

In box 200, central control 118 sends control signals based on whether the address received is in the shared address space range. If so, the control signals generate an appropriate shared address space identifier (AID) stored in SharedAID register 132. But if not, the control signals generate a switched AID from those stored in AID random access memory (RAM) 124, as described below. Thus, address decode 114b, central control 118, SharedAID register 132 and AID RAM 124 together serve as means for generating an address space identifier identifying one of a plurality of address spaces by using a virtual address. SharedAID register 132 serves as part of means for generating a shared address space identifier in response to address decode 114b and central control 118, while AID RAM 124 serves as part of means for generating a switched address space identifier in response to address decode 114b and central control 118.

In order to generate a switched AID, central control 118 first causes the value received on Pn pads 102 to be latched in masterPn latch 120. The value received on Pn pads 102, as noted above, identifies the processor requesting a translation. Since the requesting processor will be the processor which has control of common bus 42, this value could be provided by the bus arbitration circuitry upon granting bus control to a processor. The processor identifier in masterPn 120 is provided through Pn multiplexer 122 to AID RAM 124, which serves as a lookup table storing the AID value representing the current address space in which each of the processors is operating. The other input to Pn multiplexer 122 is from explicitPn register 126, which temporarily stores a processor identifier received with any of the servicing commands. Pn multiplexer 122 is either biased to feed the value in masterPn 120 to the address port of AID RAM 124 or else central control 118 may send it a select signal causing it do so during the step in box 200 in FIG. 5.

In box 202 in FIG. 5, the AID generated as set forth above is conveyed over the Q bus to AID register 128 where it is temporarily stored. The operations on the buses are controlled by central control 118, and each connection to a bus may be through a tri-state device which can be switched by central control 118. Also in box 202, the virtual address in DataRegIn 116 is loaded into VP register 130, using the P bus. As noted above, the value received on data/address pads 106 is automatically latched in DataRegIn register 116. When a Read-Map command is received, this value is the virtual address to be translated. Only the page part of the virtual address is used by map cache 58. For example, if a full virtual address (VA) is 32 bits, the virtual page address (VP) may be the high order 22 bits of VA.

In parallel with the above operations, the VP is also provided to the bypass logic 136, in box 204, which may be done while the VP is being loaded into VP register 130 in box 202. Bypass logic 136 makes it possible for a processor to address bypass area 50 without mapping either by reference to entries stored in map cache 58 or by reference to a map table in main memory 48. In the embodiment of FIG. 4, every virtual address accessing bypass area 50 is translated algorithmically into a real bypass area address by bypass logic 136. Therefore, neither a map cache miss nor a map table miss can occur during an access to bypass area 50. Bypass logic 136 thus serves as means for determining from a virtual address whether it is in the set of bypass virtual addresses and, if so, for algorithmically obtaining a real bypass area address based on the virtual address.

Figure 5A:
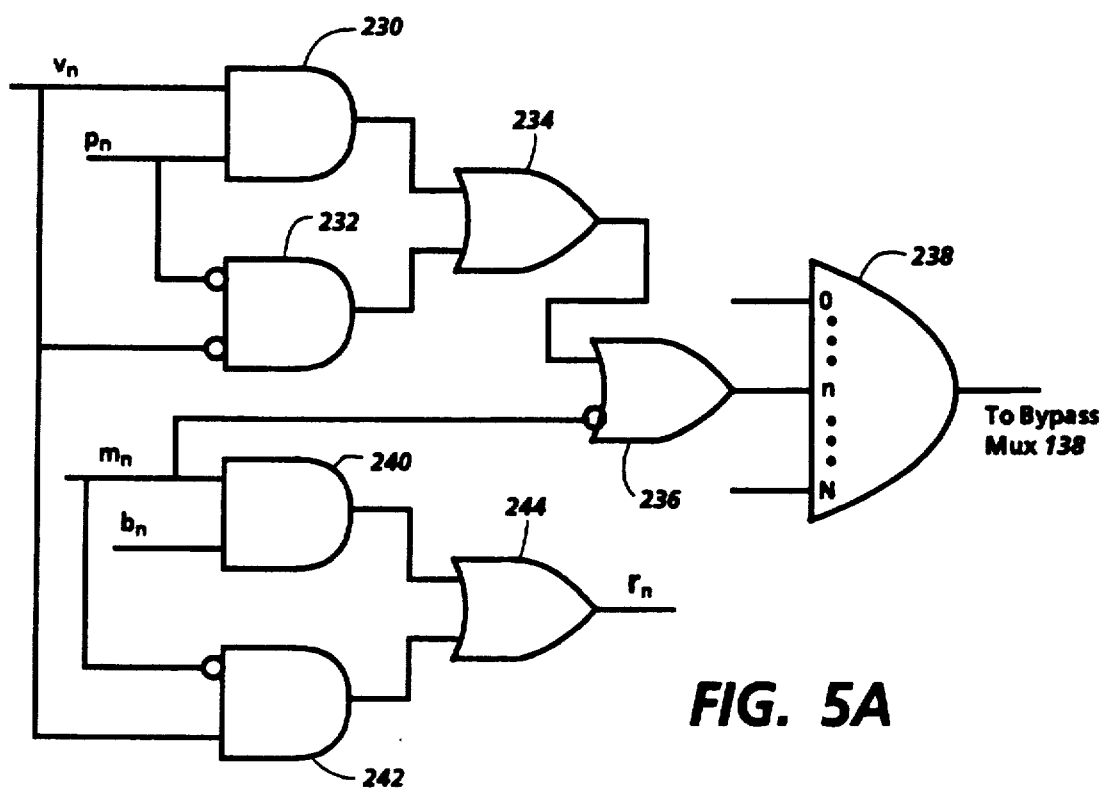
FIG. 5A is a schematic circuit diagram illustrating the operation of the bypass logic of FIG. 4.

The size and location of bypass area 50 in main memory 48 are determined by three quantities stored in bypass logic 136, a bypass mask, a bypass pattern and a bypass base. The manner in which these quantities are used to determine whether the virtual address corresponds to a real address in bypass area 50 and, if so, to obtain the real bypass area address, is illustrated in FIG. 5A. FIG. 5A shows a simple logic circuit which handles one bit $v_n$ of a virtual address and the corresponding bits $m_n$, $p_n$ and $b_n$ of the bypass mask, bypass pattern and bypass base, respectively, to obtain algorithmically the corresponding bit $r_n$ of a real bypass area address. As used here, "algorithmically" means according to a computational procedure, performed by hardware or software, which is certain to yield a result, but does not include a procedure which may not yield a result, such as a cache memory lookup which may result in a miss. The circuitry of FIG. 5A operates algorithmically to obtain one bit of a real address whenever VP is provided to bypass logic 136 in box 204.

The virtual address bit $v_n$ is compared with $p_n$ by AND gates 230 and 232, and OR gate 234 provides a high output if either of them indicates a match. This match indicating output of OR gate 234 is masked by OR gate 236 if $m_n$ is low, indicating that this bit is not one of those to be compared to determine whether the virtual address accesses bypass area 50. But if $m_n$ is high, the match indicating output is unmasked and is passed through to AND gate 238 which thus determines whether all of the unmasked bits of the virtual address match the corresponding bits of the bypass pattern. If so, a signal is sent to bypass multiplexer 138 causing it to select the output from bypass logic 136, generated by the remaining circuitry in bypass logic 136. But if a match does not occur, then the output of AND gate 238 will be low, and bypass multiplexer 138 will receiving a signal causing it to select the values provided to it from the P and Q buses, as described below.

For each of the bits which is not masked by $m_n$, the corresponding bit $b_n$ of the bypass base is selected by AND gate 240, but for each bit which is masked, $v_n$ is selected by AND gate 242. The value, either $b_n$ or $v_n$, which is selected is then passed through OR gate 244 and is provided as the corresponding bit $r_n$ of the real bypass area address. Thus $r_n = (m_n \wedge b_n)$ $(\sim m_n \wedge v_n)$. All of the values $r_n$, together with appropriate flags, are provided to bypass multiplexer 138 in parallel to be passed through if a match occurs as described above.

From the above, it is apparent that the bypass mask, pattern and base specify the size and location of bypass area 50. The bypass base is a real address the unmasked bits of which determine the starting address of bypass area 50, in a sense. The bypass mask governs the size of bypass area 50 by determining how many virtual addresses will correspond to real addresses in the bypass area. In the implementation of FIG. 5A, those virtual addresses and the corresponding real addresses need not be contiguous.

While bypass logic 136 generates an RP and flags for bypass multiplexer 138, other values are provided to bypass multiplexer 138 resulting from the AID and VP, as shown at the left in FIG. 5. The AID and VP which were loaded in box 202 are provided to the address port of the AID-VP content-addressable memory (CAM) 142 by AID register 128 and VP register 130. AID-VP CAM 142 is a conventional content-addressable memory which, when a value which it is storing is provided to its address port and if the entry which matches that value is valid and has no parity error, provides an output on a match line corresponding to the position in which that value is stored. If it is not storing the value provided to its address port in any of its entries, it provides an output on a special line indicating no match based on an OR operation on all the match lines.

A useful feature of AID-VP CAM 142 is that one or more of the bit positions of the address port can be designated as "don't care" in response to signals from central control 118. If a bit is designated as "don't care", the contents of AID register 128 or VP register 130 at that bit position will be ignored in looking for matches. This could be done by providing two address port lines for each bit position, with one line high when a "1" is in that position in the registers, the other high when a "0" is in that position in the registers, and both lines low for "don't care", causing a match with whatever value is stored at that bit position in a CAM entry regardless of the contents of the registers. One technique for implementing this feature is described in copending, coassigned U.S. patent application U.S. Ser. No. 929,967, continued as U.S. Ser. No. 07/436,960, now issued as U.S. Pat. No. 5,045,996, incorporated herein by reference. Thus, although AID-VP CAM 142 is controlled so that it only stores a given AID-VP combination in one position, more than one matching entry can be found if some of the AID-VP bits are designated as "don't care". In responding to ReadMap, as in FIG. 5, however, none of the bit positions are designated as "don't care", so that at most one matching entry can be found.

In box 206 in FIG. 5, central control 118 tests the value on the no match line of AID-VP CAM 142 and, if it indicate that a match was found, central control 118 enables RAM access control 144, in box 208. RAM access control 144 is circuitry which functions as a series of multiplexers, one for each of the entries in AID-VP CAM 142. One of the inputs of each multiplexer is the match line for the entry. In this case, the multiplexer within RAM access control 144 corresponding to the matching entry is controlled by central control 118 so that the match line for the matching entry is applied to RP-Flags RAM 146, causing a real page address (RP) and a set of flags to appear at the output of RP-Flags RAM 146. These values are stored in RP register 148 and flags register 152, respectively, in box 210.

Then, in box 212, RP and flags are applied to bypass multiplexer 138. For design reasons, it may be preferable to store several RPs with their respective flags for each AID-VP combination, in which case low order bits of VP may be used to select the RP and flags which appear at the output of RP-Flags RAM 146 from those corresponding to the matching entry in AID-VP CAM 142.

As noted above, bypass logic 136 selects the value to be output by bypass multiplexer 138 based on whether VP is in the bypass address range. If VP is in the bypass address range, the real bypass address from bypass logic 136 is provided on the R bus, but otherwise RP and flags from RP-Flags RAM 146 are provided on the R bus. In either case, central control 118 loads the results from the R bus into DataRegOut 156, in box 214. Then, in box 216, a predetermined command value indicating completion of a map cache operation is provided by done register 158 to command pads 104, while the results are provided by DataRegOut 156 to data/address pads 106.

Central control 118 may determine in box 206 that the AID-VP combination does not match any of the entries in AID-VP CAM 142, either because the AID-VP combination has not been written or because a parity error is detected in the entry which matches. In that case, another test in box 218 determines whether the VP was in the bypass address range. If so, bypass logic 136 will have generated a select signal to bypass multiplexer 138 as described above, and central control 118 also receives this signal. If the signal indicates the VP was in the bypass address range, a map cache miss has not occurred, even though no matching entry was found, because a real bypass area address has been algorithmically obtained. But if not, it is necessary to indicate a map cache miss. A value from fault register 162 which indicates a fault or miss is loaded into DataRegOut 156 in box 220. Then, as above, the contents of done register 158 and DataRegOut 156 are provided to the pads in box 216.

Map cache 58 will have certain limitations on its capacity which will affect the translation operation described above. The number of Pn pads 102 will limit the number of processors which can use a single map cache for virtual address translation. The number of bits per entry stored in AID RAM 124 will limit the number of available address spaces in which those processors can operate. For example, if AID RAM 124 stores 10 bit entries, each AID can be at most 10 bits in length, for a maximum of 1024 address spaces. The number of entries in AID-VP CAM 142 and RP-Flags RAM 146 will limit the performance of map cache 58, since a lower number of entries will result in more frequent map cache misses. The limitations resulting from AID RAM 124 could, of course, be avoided by providing an AID from the processor cache. Generally, however, the design of map cache 58 must take these constraints into account.

In addition to the translation operations, a number of servicing operations can be used to initialize map cache 58 or to handle a map cache miss. Most of these operations involve reading, writing or flushing entries stored in a component in map cache 58.

Operations for reading, writing and flushing entries in AID-VP CAM 142 and RP-Flags RAM 146 make it possible to manage these components like a cache. As described above, these components thus serve as means for storing a plurality of entries, each entry associating an address space identifier and virtual address with a real address. In the ReadMap operation described above, they provide the real address of one of the entries in response to the address space identifier and virtual address of that entry. In addition, the read operation can be used to verify the contents of map cache 58. The write operation can be used to load a new entry into map cache 58 when a map cache miss occurs. The flush operations can be used to remove one or more entries from map cache 58.

AID-VP CAM 142 and RP-Flags RAM 146 together with supporting circuitry including RAM access control 144 and CAM control 164 may be viewed more generally as a cache array 166 having a number of entries or lines. Cache array 166 serves as means for obtaining a real address for accessing memory using the address space identifier and virtual address. Each line includes a row from AID-VP CAM 142 and from RP-Flags RAM 146. Each line may be controlled using a number of associated control bits. Exemplary control bits include vSel, a victim select bit which can only be set for one line at a time; rSel, a refresh select bit which can only be set for one line at a time and is used to select a line to be refreshed if the lines include dynamic cells; ref, a reference bit which is set whenever a line is used in a ReadMap operation and which is cleared whenever a line is passed over as a victim; and other bits as necessary to indicate the validity of data stored on a line.

The vSel and ref bits for a line may be used in managing the cache array so that lines used most frequently in translation are least likely to be picked as victims, i.e. to be written over by a new entry to be added to cache array 166.

The victim select logic, which is included in CAM control 164, may be distributed over cache array 166 in the form of logic components which perform the following operations: When a map cache miss occurs, the line which has vSel set is checked first; if its ref bit is clear, then it is the victim; but if its ref bit is set, both the vSel and ref bits are cleared and the vSel bit for the next line in sequence is set, and it is then checked in the same manner. These operations continue until a line with a clear ref bit is found, and that line is chosen as victim.

When a victim is selected, a victim select signal is provided to that line's multiplexer in RAM access control 144. In response to central control 118, RAM access control 144 selects the victim select signal rather than the match signal to enable that line to be loaded with a new entry. This technique approximates least frequently used victim selection, because the ref bit of a line accessed by ReadMap will be set, even though it may have previously been cleared during victim selection, so that it will be saved next time the victim select process reaches it.

If a processor provides a VP and a command asking for an entry to be read (ReadEntry), central control 118 responds much as if it were performing a ReadMap operation as described above. If the VP is in the bypass address range, the real bypass address from bypass logic 136 is returned together with appropriate flags. A fault signal is returned if a map cache miss occurs. Otherwise, the matching entry from RP-Flags RAM 146 is returned, after parity checking as described above.

If a processor provides a VP, an RP and a set of flags, with a command asking for an entry to be written (WriteEntry), central control 118 operates much differently than for ReadMap or ReadEntry. In the implementation of FIG. 4, the entry to be written must be loaded in two stages. In the first stage, an AID and VP are loaded into AID register 128 and VP register 130. The AID may be obtained by latching the processor number in masterPn register 120 through Pn multiplexer 122 to AID RAM 124. The AID provided by AID RAM 124 is then loaded into AID register 128. Alternatively, the shared AID may be loaded from SharedAID register 132 into AID register 128. Meanwhile, the VP latched in DataRegIn 116 is loaded into VP register 130. A parity bit based on the values in AID register 128 and VP register 130 may also be calculated. During the second stage, the RP and flags latched in DataRegIn 116 are loaded into RP register 148 and flags register 152. In order to avoid duplicate entries, it is necessary to attempt to match the AID and VP before writing a line. If a match is found, central control 118 causes RAM access control 144 to select the matching entry's match line. But if no match is found, a victim line is selected as described above in relation to victim select logic, and RAM access control 144 is caused to select the victim's victim select line. The line in cache array 166 with a high match line or a high victim select line is thus selected and is written as a unit. The contents of AID register 128, VP register 130, RP register 148 and flags register 152 are all written into the selected line, together with appropriate parity bits.

The ReadEntry and WriteEntry operations have been described as if each processor could only read and write an entry in its current address space. It would also be possible for a processor to specify an address space AID to be loaded into AID register 128 for reading or writing or to specify a processor number to be loaded into explicitPn register 126 and applied through Pn multiplexer 122 to AID RAM 124 in order to obtain the AID of that processor's current address space for AID register 128. In this case, the processor could then read or write an entry in the selected address space, regardless of whether that is its current address space.

Several flush operations are desirable, to flush an entry (FlushEntry), to flush entries from a specific address space (FlushSpace) and to flush all entries (FlushCache). Each of these operations deletes one or more entries from AID-VP CAM 142 and RP-Flags RAM 146.

When map cache 58 receives a FlushEntry command with an AID and VP, central control 118 causes the AID and VP to be loaded into AID register 128 and VP register 130, after which a match is attempted in AID-VP CAM 142. If a match is found, the matching entry's valid bit in CAM control 164 is cleared. If there is no match, FlushEntry has no effect.

FlushSpace is similar to FlushEntry, except that there may be more than one match, since only an AID is received, the bits of the VP being designated by central control 118 as "don't care". The valid bit of each of the matching entries, if any, is cleared.

FlushCache clears the valid bit of every entry.

In the implementation of FIG. 4, it is also necessary to change the contents of AID RAM 124 when a processor changes address spaces. Operations are also available to read (ReadSpace) and write (WriteSpace) the contents of a processor's entry in AID RAM 124.

When map cache 58 receives a ReadSpace command, central control 118 latches the processor identifier of the requesting processor into masterPn register 120, and routes it through Pn multiplexer 122 to the address port of AID RAM 124. The output of AID RAM 124 is provided to the R bus, and is routed to DataRegOut register 156. Central control 118 then sends the contents of done register 158 and DataRegOut register 156 to the pads to be returned.

When map cache 58 receives a WriteSpace command together with an AID to be written, central control 118 similarly addresses AID RAM 124 to be written after applying the AID from DataRegIn register 116 to the data port of AID RAM 124. As a result, the AID is written into AID RAM 124 in the entry corresponding to the requesting processor.

Although bypass area 50 will typically not change in location or size during system operation, it is preferable to be able to reconfigure this area at system startup. Therefore, it is advantageous to have operations for reading (ReadBypass) and writing (WriteBypass) the values bypass mask, bypass pattern and bypass base which determine the location and size of bypass area 50 according to the simple hardware implementation described above in relation to FIG. 5A. Each of these three values will be stored in a respective register in bypass logic 136.

When map cache 58 receives a ReadBypass command together with an indication of which of the three bypass registers is to be read, the bypass register identifier is automatically latched into DataRegIn register 116.

The bypass register identifier is then applied to bypass logic 136 together with appropriate control signals so that the word contained in the identified register will appear at the output to bypass multiplexer 138, which is also enabled to pass that word to the R bus. The word is routed to DataRegOut register 156 and central control 118 then sends the contents of done register 158 and DataRegOut register 156 to the pads to be returned.

When map cache 58 receives a WriteBypass command together with an indication of which of the bypass registers to write and the word to be written the bypass register identifier and the word are automatically latched into DataRegIn register 116. The bypass register identifier and the word are then applied to bypass logic 136 together with control signals so that the word will be written into the correct register. At power up, the Bypass Mask register is set to zero, so that initially all virtual addresses are in the set of bypass virtual addresses. This is useful to initialize memory at system startup.

It should be emphasized that map cache 58 as described above has certain desirable features which contribute to simplicity and performance. It is a pure cache in the sense that an entry is never modified by the map cache once it has been read in. If a map entry must be changed, the copy in map table 60 is changed first and then the changed entry is written into map cache 58. Since map cache 58 only contains copies of the correct or true entries in map table 60, a map entry may be deleted from map cache 58 at any time. This allows more data to be packed into map cache 58 by using dynamic memory cells which are smaller but more error prone than static cells. This is possible because errors are not a problem—it is only necessary to detect the error by a technique such as parity checking and then flush the erroneous entry. Also, cache array entries never need to be written through or written back, which simplifies the control logic of map cache 58. Another desirable feature of map cache 58 as described above is that it is always a slave to the bus master. Therefore, it never needs to request control of bus 42, and all of its bus interactions are simple, minimizing the control logic for bus interface.

Having explained the structure and operation of map cache 58, we turn now to the processor caches 54, 56. As will be seen, each processor cache includes means for interacting with map cache 58.

3. Processor Cache

As shown in FIG. 2, each processor 44, 46 has a respective processor cache 54, 56. In the implementation of a shared memory multiprocessor shown in FIG. 2, processor caches 54, 56 are connected to common bus 42, so that communication between a processor 44, 46 and main memory 48 or map cache 58 is through the respective processor cache 54, 56. Therefore, each processor cache is preferably structured to perform the necessary operations to obtain translated virtual addresses from map cache 58 and to access main memory 48 when necessary, in addition to serving as a cache memory.

The basic structure of one processor cache which may be used in the present invention is disclosed in copending coassigned U.S. patent application Ser. No. 930,172, now issued as U.S. Pat. No. 4,843,542, which is incorporated herein by reference. A number of processor cache features are useful in implementing the present invention. For example, the processor cache is preferably fully associative in both directions, meaning that it contains a CAM such that either a virtual address received from its respective processor or a real address from the bus will select the corresponding cached data entry. Thus the processor cache includes means for determining whether a virtual address is stored therein and, if so, for returning the associated data. If the virtual address is not stored therein, either in its full form or as a virtual page address, the processor cache further includes means for providing the virtual address to map cache 58. For that and other purposes, each processor cache has means for requesting bus control and preferably maintains control until a response from map cache 58 is completed, so that map cache 58 can always be a slave.

In addition to the above features, each processor cache contains control logic enabling it to handle requests from both sides, so that the data entries it contains are available to other components connected to common bus 42. If it receives a request from its processor which requires a response from the bus, it may assume of course that its processor will make no more requests until a response is received. In other cases, it must resolve conflicting requests in the conventional manner. Means are provided by which each cache may determine that data it is storing is shared with other caches.

Figure 6:
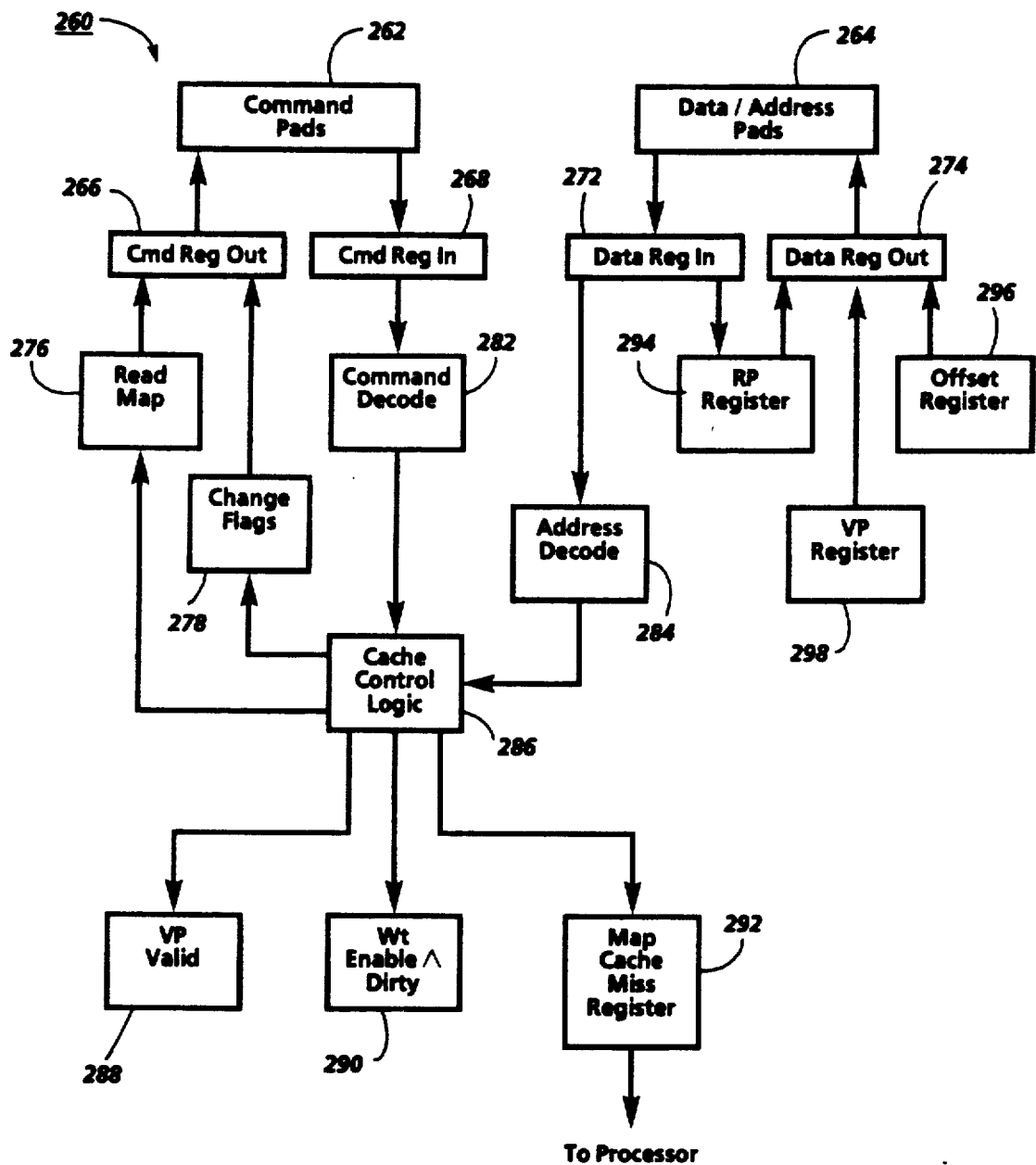
FIG. 6 is a schematic block diagram showing some features of a processor cache of FIG. 2.

FIG. 6 shows schematically a number of features of processor cache 260 which are involved in its interactions with map cache 58. Processor cache 260 has command pads 262 and data/address pads 264 for sending and receiving signals on the corresponding lines of bus 42. A command to map cache 58, for example, is loaded into CmdRegOut register 266 and will be sent when processor cache 260 gains control of bus 42. Control is held until the response from map cache 58 is received and loaded into CmdRegIn register 268. Data accompanying the response is loaded into DataRegIn register 272. Data to be sent with a command is loaded into DataRegOut register 274.

Two commands which processor cache 260 sends are ReadMap, discussed above, and ChangeFlags, used to change flags in processor cache entries. Therefore, processor cache will have these commands stored in ReadMap register 276 and ChangeFlags register 278 to be loaded into CmdRegOut 266. Processor cache 260 also sends other commands in a similar manner.

When a command is received in CmdRegIn 268, it is decoded in command decode 282. Also, some of the data from DataRegIn 272 may be decoded by address decode 284 for certain commands. If the command and address require action by processor cache 260, signals are provided to cache control logic 286 indicating the action required. Cache control logic 286 is connected to be able to control the components of processor cache 260, and exemplary lines are shown connecting it to ReadMap register 276, ChangeFlags register 278, VPValid bit 288 and wtEnableADirty bit 290. Cache control 286 is also shown connected to map cache miss register 292, which it may use to signal the respective processor that a map cache miss has occurred. Other registers controlled by cache control 286 include RP register 294 for receiving an RP from DataRegIn 272 and for providing the RP to DataRegOut 274; VP register 298, from which a VP may be loaded into DataRegOut 274; and offset register 296, from which an offset may be concatenated with an RP being loaded into DataRegOut 274.

Processor cache 260 invokes virtual address translation by map cache 58 when it receives a virtual address from its respective processor and neither has the data corresponding to that virtual address in its cache memory nor is able to generate the real address corresponding to that virtual address for accessing main memory 48. As described in copending coassigned U.S. patent application Ser. No. 930,172, now issued as U.S. Pat. No. 4,843,542, for example, processor cache 260 may attempt after a local miss to locate within its CAM the real page address corresponding to the virtual page address portion of the virtual address. At an appropriate time, cache control logic 286 causes bus interface circuitry (not shown) to request control of bus 42 so that it can request virtual address translation.

Upon receiving bus control, cache control logic 286 causes the command ReadMap from ReadMap register 276 to be loaded into CmdRegOut 266 and provided to command pads 182. VP, the part of the virtual address specifying the virtual page is similarly loaded from VP register 298 into DataRegOut register 274 and provided to data/address pads 264. ReadMap is received by map cache 58, as described above in relation to FIG. 4, and results in a Done command, either with the results of the translation or with a value indicating a map cache miss.

When processor cache 260 receives the Done command in CmdRegIn 268 and the accompanying data in DataRegIn 272, command decode 282 and address decode 284 provide signals to cache control logic 286 indicating whether a map cache miss occurred. If not, the value in DataRegIn 272 will include an RP and flags. The RP can be transferred through RP register 294 to DataRegOut 274, and concatenated with an offset from offset register 296 to form a complete real address (RA). This RA together with an appropriate command are sent to main memory when processor cache 260 next obtains bus control as would be conventionally done after virtual address translation. But if a map cache miss did occur, cache control logic 286 sends a signal so indicating from map cache miss register 292.

The processor responds to the map cache miss signal by performing an operation described in detail below. During the handling of a map cache miss or during certain other operations, it may become necessary to modify one or more flags in the cache memory of processor cache 260. For example, it may be necessary to clear the VPValid bit 288 of one or more entries to indicate that they no longer contain valid data. Or it may be necessary to set or clear the wtEnabledADirty bit 290 of one or more entries to indicate whether a write protect fault should occur when one of those entries is written. Processor cache 260 receives a signal from its respective processor indicating when it is necessary to modify flags together with a value to be loaded into DataRegOut 274 to indicate which of the processor caches in the system and which entries in those caches are affected by the specified flag change. In response, cache control logic 286 loads the ChangeFlags command from ChangeFlags register 198 into CmdRegOut 186 and, when it has bus control, sends the contents of CmdRegOut 186 and DataRegOut 194 to command pads 182 and data/address pads 184, respectively.

The data which is sent with ChangeFlags includes indications of which processors are affected, so that not only the processor cache which is bus master but also other processor caches may be affected. Command decode 282 and address decode 284 signal cache control logic 286 if processor cache 260 is affected, and also indicate the nature of the operation to be performed. In response, cache control logic 286 causes the appropriate operations to occur on VPValid bit 288 and wtEnableADirty bit 290.

Based on the above, we turn now to a discussion of the contents of bypass area 50, including map table 60 and certain routines which involve map cache 58.

4. Bypass Area

As noted above, map cache 58 translates virtual addresses corresponding to real addresses in bypass area 50 algorithmically, and this is the key feature which defines bypass area 50. This feature makes it unnecessary to store mapping entries for bypass area 50, which might otherwise fill up cache array 166, and also ensures that a map cache miss will not occur in accessing bypass area 50.

Bypass area 50 solves a number of problems in system 40. Data and instructions can be stored in bypass area 50 for use by any processor in handling a map cache miss, so that a processor encountering a map cache miss may immediately proceed to execute an appropriate routine to retrieve the missing entry and load it into map cache 58. More subtly, the availability of bypass area 50 makes it possible to flexibly divide the translation function between hardware and software in whatever way is appropriate for a particular implementation. Map cache 58 contains hardware features which are necessary for speed, while bypass area 50 contains software features which complete the translation function. As a result, enhancements in both function and performance can be made relatively easily. In particular, the structure of map table 60 can take any appropriate form since the hardware has no knowledge of it.

One key to the performance of bypass area 50 is the choice of an appropriate form for map table 60. Conventionally, a direct map table for use with multiple address spaces includes, in effect, a separate map table for each address space. As a result, it is not possible to store the entire map table in main memory, because of its size. Therefore, the conventional map table is likely to be slow because a page fault may occur even when accessing data in main memory if the relevant portion of the map table is not currently in main memory. To service the page fault it is necessary to access secondary or disk memory, resulting in long delays. Some attempts have been made to reduce the size of each address space's map table, but a smaller map table may not permit sharing between multiple address spaces. Therefore, the conventional map tables are not fully satisfactory.

The present invention is based in part on the recognition that a smaller map table can be structured so that it will only encounter one type of fault, a combined map table and page fault, even if data is shared between multiple address spaces. For example, the map table can be structured and updated according to an "all-or-nothing" rule, under which it either contains all the entries corresponding to a page in main memory or no entries for the page, in which the page is not in main memory. Since the map table contains entries only for those pages in main memory, translation will proceed very rapidly because there will be no page faults to retrieve map table entries.

Furthermore, since the map table contains all the entries for each page in main memory, a map table fault will mean that the corresponding page is not in main memory and must be retrieved from secondary memory. Therefore, every map table fault is also a page fault, which would require servicing even if a map table fault had not occurred. If main memory is sufficiently large, which it must be to get good performance, map table/page faults will be extremely rare, even though the map table itself is compact. Thus, a map table according to the invention occupies only a small, fixed fraction of main memory.

Structuring the map table to have only entries for pages in main memory reduces its size, making it necessary to find a desired entry using a technique such as a hash table or searching. According to one aspect of the present invention, the map table must be large enough to contain more than one entry for at least one page in main memory 48. Since some pages may be shared among multiple address spaces, it is necessary to allow for more than one entry for some pages, and it is preferable to have enough entries to store more than one entry for a relatively large proportion of the real pages. For example, the map table may include between 1.5 and 2 entries per real page. The map table could be made even larger if necessary, but a large map table reduces available memory for the application.

According to one aspect of the present invention, the need for additional map table entries may be reduced by using a shared address space such as Space 0, discussed above in relation to FIG. 1. The shared address space reduces the need for additional map table entries because each access to the shared address space is translated by map cache 58 into an access to a single address space with the same AID, regardless of which processor requested access. Therefore, if a page in real memory is allocated to the shared address space, that page has one entry in the map table for translating the shared AID and the page's VP into an RP. This form of sharing of a page in real memory is also referred to as aliasing, and it reduces the need for additional map table entries, since shared pages which are in the shared address space only require one map table entry at most while shared pages otherwise require one map table entry for each address space in which they are accessible.

As noted above, one aspect of the invention is to use a map table each of whose entries can store data associating a virtual address in any of the multiple address spaces with a real address. This makes better use of the space allocated to the map table. From general principles of resource utilization, it is clear that the memory of a single table is utilized much better than the memories of several separate tables each containing one address space.

The actual size of the map table as a fraction of main memory can be estimated based on address lengths. If each real address is R bits long, and each real page address is P bits long, real memory will contain at most $2^R$ words and at most $2^P$ pages. Given that each entry contains an AID, a VP, an RP and some additional data, it should be possible to include a complete entry in four words or less, given that each word is about R bits long. Therefore, the size ratio $S_{mt}$ of the map table and main memory can be estimated:

$$S_{mt} = [(\text{entry size}) \times (\text{\# of entries in table})]/(\text{memory size}) = 2^2 \times 2^P \times 2 - R = 2^{(2+P-R)}.$$

Thus, if an offset of 10 bits is used, so that $R - P = 10$, $S_{mt} = 2 - 8 \leq 0.5\%$ of memory, if there is only one entry per page in main memory. By making the map table large enough to include two entries per page, we increase it somewhat, but it is still less than 1% of main memory.

Figure 7:
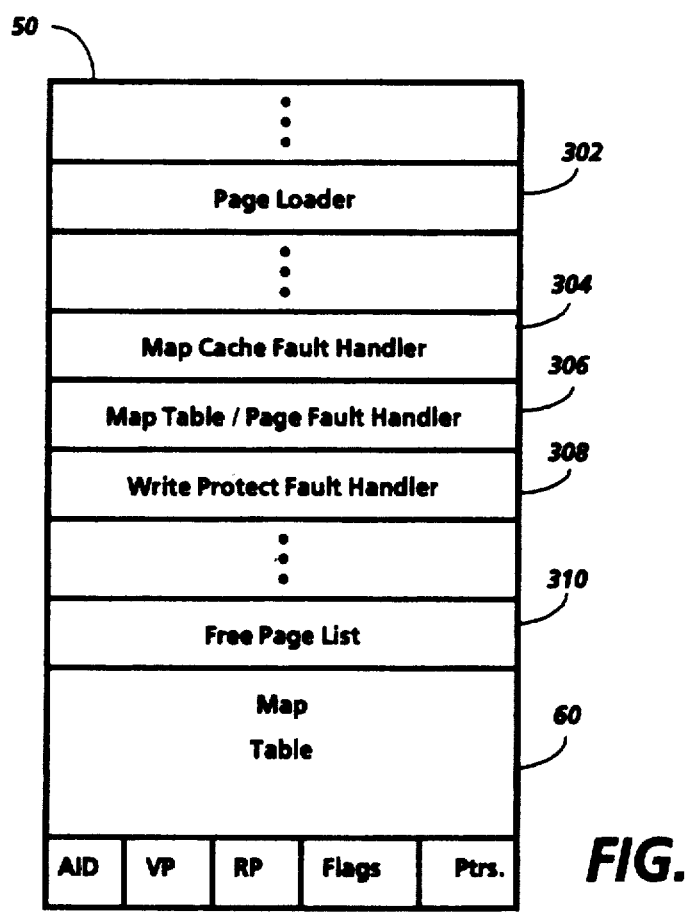
FIG. 7 is a schematic diagram illustrating the contents of the bypass area in main memory.

FIG. 7 shows an example of the contents of bypass area 50, including map table 60. Bypass area 50 contains a number of miscellaneous low level routines such as page loader 302 which provide basic functions. Page loader 302 is used when it is necessary to load a page from secondary memory 62 into main memory 48. Bypass area 50 also contains a number of higher level routines which may call the low level routines and which are accessed by one of the processors when necessary. Most of these are conventional routines, but some relate to map cache 58, including map cache fault handler 304, map table/page fault handler 306 and write protect fault handler 308. Bypass area 50 also contains a free page list 310 which contains a list of the free pages in paged area 52 to assist in determining which page should be used when a page fault occurs. Finally, bypass area 50 includes hashed map table 60. Each entry in map table 60 includes at least an AID, a VP, an RP, associated flags and one or more pointers.

If a large number of address spaces are made available to the processors in a system and each address space has a range approximately as large as paged area 52, a large number of virtual addresses will inevitably be hashed to the same entry in map table 60. A hashing algorithm may be chosen which will tend to spread the virtual addresses over the map table entries, but situations will occur in which more than one entry must be stored for a single hashed address. In this event, one of the entries is stored at that address together with a pointer to another address in map table 60 at which the other entry is stored. The pointer may, for example, be the offset from the first address to the second. Similarly, additional entries having the same hashed address can be stored by chaining together entries, using either linear or tree structured chaining. The choice between linear and tree structured chaining is an example of a map table design choice which is available because the map table structure is implemented entirely in software. Thus, hashed map table 60 can accommodate a number of entries with the same hashed address.

Figure 8:
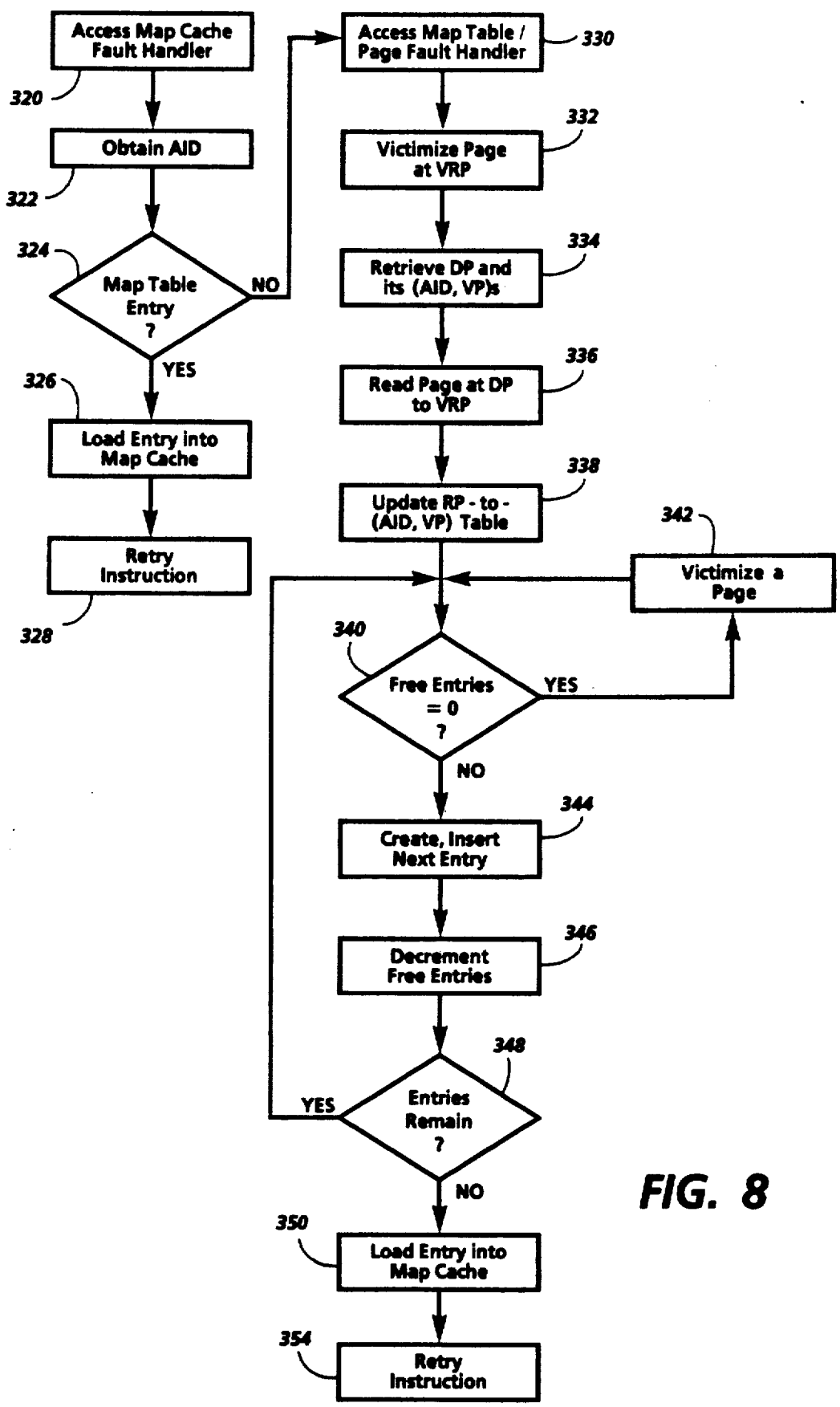
FIG. 8 is a flow chart illustrating the execution of instructions from the bypass area of FIG. 7 upon occurrence of a map cache miss.

FIG. 8 shows how map cache fault handler 304 and map table/page fault handler 306 in bypass area 50 may be accessed to handle a map cache fault. Before they are accessed, one of the processor caches receives a command and data indicating a map cache miss and provides a map cache miss signal to its respective processor. In order to begin the steps in FIG. 8, that processor must retrieve a virtual address for map cache fault handler 304. The processor then accesses map cache fault handler 304 in box 320 by providing this virtual address to its processor cache. If the processor cache does not have the first block of the handler in its cache memory, and is unable to translate the VP into an RP, it will send the VP to map cache 58 with a ReadMap command, and will thus obtain a translated RP in bypass area 50. This translated RP is then used to access map cache fault handler 304.

Map cache fault handler 304 could be implemented in a number of ways. In the implementation of FIG. 8, the processor which received the map cache miss continues to execute a series of instructions retrieved in sequence from bypass area 50, performing as it does so the functions shown. Each time it moves to the next instruction, it provides a virtual address to its processor cache which then proceeds as set forth above in obtaining the data corresponding to that address. While executing the steps shown in FIG. 8, the processor serves as means for loading an entry into map cache 58 associating a missed AID and VP with an RP. It also serves as means for accessing the map table and for generating a map table miss signal if the map table does not contain the necessary entry. In addition, in executing map table/page fault handler 306, it serves as means for loading a corresponding page into paged area 52 and as means for updating the map table after the page is loaded in accordance with the "all-or-nothing" rule.

In box 322, the processor obtains the appropriate AID. The AID is ordinarily either the shared AID or that processor's current switched AID. The AID will not be available from the processor cache, since the processor cache entries are accessible with the VP alone as a result of the mutual exclusivity of the switched and shared address ranges. As a part of the map cache fault handler, the processor could test VP to determine whether it is in the shared address range. If so, the processor would obtain the shared AID, but if not, it would obtain its current switched AID from map cache 58 using a ReadSpace command, described above. Alternatively, map cache 58 could send the AID with its map cache miss signal or could respond to an additional command received with a VP by providing the appropriate AID from AID RAM 124 or SharedAID register 132.

In box 324, the processor determines whether there is an entry in map table 60 corresponding to the AID obtained in box 322 and the VP which missed. If map table 60 is a hash table, the processor hashes the AID together with the VP to obtain a virtual page address which, when applied to map cache 58, is translated into a real address in map table 60 within bypass area 50. A number of hashing techniques are described in Thakkar, S.S., and Knowles, A. E., "A High-Performance Memory Management Scheme", Computer, May 1986, pp. 8–19 and 22, at p. 14, incorporated herein by reference. An example of a suitable hashing algorithm would be to concatenate AID and VP into (AID, VP), then fold (AID, VP) into two parts of virtual page address length and finally XOR the bits of those two parts to obtain the hashed virtual page address (HVP). Before using HVP to access map table 60, the processor performs conventional steps as appropriate to lock map table 60 during the access so that map table 60 cannot be written by another processor while being accessed. Then, the processor attempts to retrieve the corresponding entry from map table 60 using HVP.

The entry retrieval technique will depend on the structure of map table 60. For example, the processor could first determine whether the retrieved entry corresponds to (AID, VP) by comparing (AID, VP) with the AID and VP stored in the entry. If the retrieved entry does not correspond to (AID, VP), the processor could test whether the entry has a pointer to another entry in its pointer field. If so, the processor uses that pointer to retrieve the other entry in map table 60. The retrieved entry is again tested until an entry corresponding to (AID, VP) is found or an entry which does not have a pointer to another entry is reached. At that point, a map table/page fault has occurred, and it is appropriate to access the map table/page fault handler 306.

If the corresponding entry is found in box 324, the processor proceeds to load the entry into map cache 58 in box 326, using its respective processor cache to send the WriteEntry command, described above, together with the entry. Then, the processor exits map cache fault handler 304 and retries the instruction which led to the map cache miss in box 328. This time, the VP will be successfully translated to an RP in paged area 52 by map cache 58, and the respective processor cache will use this RP to retrieve the data from main memory 48 for the processor's use.

If a map table/page fault occurs, the processor may obtain the address for accessing map table/page fault handler 306 as part of map cache fault handler 304, or it may have the address stored locally from initialization. In either case, the processor uses the address to access map table/page fault handler 306, in box 330. As with map cache fault handler 304, the same processor then proceeds to execute a sequence of retrieved instructions to handle the fault.

Figure 8A:
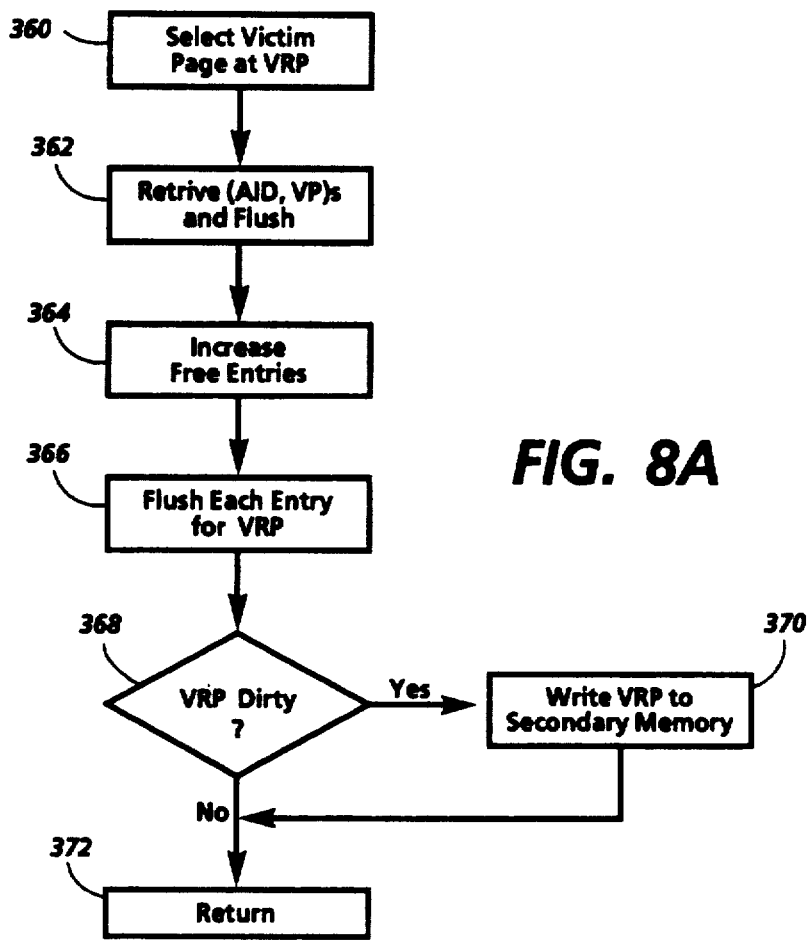
FIG. 8A is a flow chart illustrating the step of victimization in FIG. 8.

In the implementation of FIG. 8, map table/page fault handler 306 begins with the victimization of a page at VRP in paged area 52 in main memory 48, as shown in box 332. FIG. 8A shows in more detail a sequence of steps implementing victimization.

The sequence of FIG. 8A begins with the selection of the victim real page at VRP in box 360. The processor may select VRP by accessing free page list 310 to obtain the real address of the next free page, or, if none of the pages are free, by selecting the address of a page which is least recently used. Appropriate use bits may be updated each time a page in paged area 52 is accessed to indicate recency of use.

Once VRP has been selected, the processor retrieves all the (AID, VP)s which correspond to it in box 362. This can be done by accessing an RP-to-(AID, VP) table in bypass area 50 which stores the (AID, VP)s which correspond to each shared RP currently in main memory. When the (AID, VP)s have been retrieved, they are deleted from the RP-to-(AID, VP) table and flushed, because they are no longer valid.

The processor then increases a stored variable FreeEntries by the number of retrieved (AID, VP)s, in box 364. When all the entries in map table 60 are free, the value of FreeEntries is equal to the total number of entries. When none of the entries are free, FreeEntries is zero. Thus, FreeEntries is increased by the number of entries which will be freed by the victimization, which is the number of (AID, VP)s corresponding to VRP. As noted above, the processor locks map table 60 at an appropriate time for the duration of the operations modifying the contents of map table 60.

To flush each entry corresponding to VRP, in box 366, the processor begins with in map table 60. In order to find each entry, it begins with the (AID, VP) and proceeds as described above in relation to box 324. When the entry is found, the processor deletes it from the map table. When the entry has been deleted from map table 60, the processor causes its processor cache to send a FlushEntry command to map cache 58, flushing the entry from array 166 in a similar manner. Finally, the processor causes its processor cache to send a ChangeFlags command causing any processor cache entry with VRP to be flushed by clearing its VPValid bit.

When all the entries have been flushed, the processor will still have a copy of the last entry flushed, and it tests its dirty bit in box 368 to determine whether it is necessary to write the page at VRP back to secondary memory 62. If so, the page is written in box 370 by sending out the real address of each retrievable block within the page in sequence. The processor may hand this task off to secondary memory 62, which may be equipped with a bus interface which sends out the real addresses and receives and stores the retrieved data. If any such block is stored in a processor cache which has a bit set to indicate that it is the cache which has modified the data in that block most recently, that cache will respond by providing the corresponding modified data and by inhibiting main memory 48 so that it does not provide conflicting data. Otherwise, main memory will respond to each real address. The manner in which the processor caches respond to such a request is described in more detail in copending coassigned U.S. patent applications Ser. No. 930,172, now issued as U.S. Pat.

No. 4,843,542, U.S. Ser. No. 929,544, now abandoned, incorporated herein by reference.

At this point, victimization is completed, and the processor returns to the routine from which it called victimization in box 372.

After victimization in box 332, the processor returns to complete the handling of the map table/page fault. The (AID, VP) is first used to retrieve a disk page address (DP) and the corresponding (AID, VP)s from secondary memory 62. This is done by first accessing a conventional disk map table in secondary memory 62 which maps every possible (AID, VP) to a disk page address. Then, the DP obtained from the disk map is used to access a DP-to-(AID, VP) table in secondary memory 62 which lists all of the (AID, VP)s which are mapped to every DP, like the RP-to-(AID, VP) table discussed above.

Using DP, the processor then reads the page at DP into main memory at VRP, using page loader 302. Page loader 302 is conventional.

Once the page is loaded, the processor updates the RP-to-(AID, VP) table in box 338. In other words, all of the (AID, VP)s corresponding to DP are entered into the table entry corresponding to VRP for use in subsequent victimization.

Then the processor begins to update map table 60, locking the map table for the duration of the update. In box 340 it tests whether FreeEntries is equal to zero. If so, there are no free map table entries, so that another page must be victimized in box 342, following the sequence described above in relation to FIG. 8A. But if there is at least one free map table entry, the processor will find a free map table location and will create and insert the next entry at that location, in box 344. The entry will be created from the next (AID, VP), VRP, a set of flags and one or more pointers, if necessary. The flags will include a dirty bit, initially cleared; a Space-Shared bit which will be set if more than one (AID, VP) corresponds to DP, and hence to VRP; a wtEnable bit based on the wtEnable bit of the entry in the disk map table; and appropriate bits indicating the least recently used status of the entry. In inserting the entry, it may be necessary, of course, to update pointers in other entries.

One technique for finding an appropriate hash table entry and for determining whether it is necessary to modify pointers begins by hashing the values in the AID and VP of the entry being inserted to provide a map table location. The AID and VP of the entry at that location are then hashed to determine whether that entry is pointed to by a pointer in another entry. If so, the entry which is pointed to is replaced by the entry which belongs in that location based on hashing. The replaced entry pointed to is moved to another location and the entry containing a pointer to it is found and updated. Also, the pointer within the replaced entry is corrected if necessary based on the new location. Finally, the new entry including the missed (AID, VP), the RP which has been loaded, and flags, is stored in the former location of the replaced entry. If, on the other hand, the hashed AID and VP of the entry previously in the map table location is the same as that location, then the entry stored in that location will be left where it is, since it belongs there. If that entry does not have a pointer to another entry, another location is selected based on having its valid bit cleared or on its least recently used flag. A pointer to this selected location is added to the entry which did not have a pointer. But if the entry does have a pointer, the processor proceeds through the pointer chain until it can insert a pointer and does so.

Once the new entry has been stored in map table 60, FreeEntries is decremented in box 346, and the processor tests in box 348 to determine whether it must insert additional new entries for (AID, VP)s corresponding to the newly loaded page at VRP. If so, the sequence of steps in boxes 340-348 is repeated until no new entries remain to be inserted.

When all of the new entries have been inserted in map table 60, map cache 58 may be updated. Only the new entry corresponding to the (AID, VP) which missed is retrieved from map table 60 and loaded in box 350 into map cache 58 using the WriteEntry command discussed above. At this point, the processor has completed handling the map table/page fault and the map cache fault, so that it returns and retries the instruction which resulted in the map cache fault, in box 354. Its processor cache will again have a miss, but map cache 58 will return the RP and flags, making it possible to retrieve the required data from main memory 48.

Figure 9:
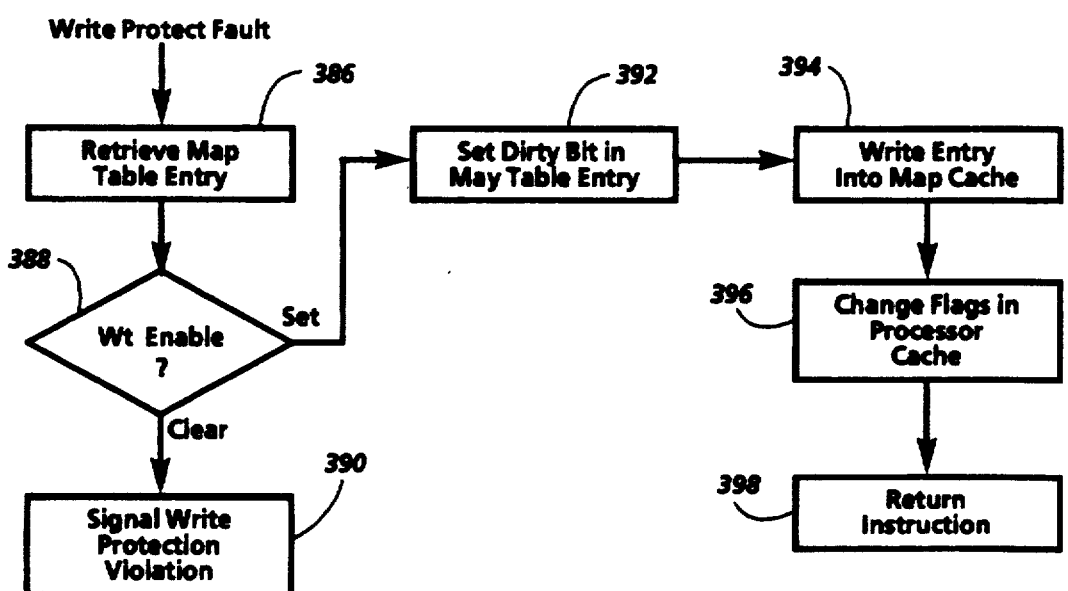
FIG. 9 is a flow chart illustrating the handling of a write protect fault by executing instructions from the bypass area of FIG. 7.

In addition to map cache fault handler 304 and map table/page fault handler 306, bypass area 50 also contains other high level routines. Most of these routines are conventional and do not relate to the present invention, but write protect fault handler 308 is one high level routine which is preferably modified according to one aspect of the present invention. FIG. 9 shows an implementation of write protect fault handler 308 according to the invention.

Write protect fault handler 308 will be accessed by a processor when it attempts to write to a page which is in its processor cache but whose wtEnableADirty bit 290 is cleared, indicating either that the page is not write enabled or that it has not previously been written. In other words, the wtEnableADirty bit is the conjunction of two bits: The Dirty bit, when set, conventionally means that the page has been written since it was brought in from secondary memory 62, and is important in deciding whether the page must be written back to secondary memory 62 before it is replaced with a new page, as discussed above. The wtEnable bit, when set, conventionally means that the page can be written because it is not protected. If the page is permanently protected, it should never be written, and an instruction to write to it should result in a program error. A page which is not permanently protected can also be thought of as temporarily protected until the first time it is written, after which it is dirty and can be freely written. Although these two conventional bits are represented by the single wtEnableADirty bit 290 in an entry in a processor cache, both bits will be present in the corresponding entries in map table 60 and in map cache 58 for reasons explained below. The use of a single bit in the processor caches is simpler than two bits.

The present invention, as discussed above, is based in part on the recognition that map cache 58 may be a pure slave, which never reads or writes to main memory 48, in order to keep it simple. This means that if an entry is changed or an error is detected in an entry, the entry is thrown away without being written back to main memory 48. When necessary to respond to a request from a processor cache, a new entry is loaded into map cache 58 containing the correct current information. Thus the sequence is always to change an entry in map table 60 before writing that entry into map cache 58.

A page's entry in map table 60 must be changed by setting its dirty bit the first time one of the processor cache entries included in that page is written by the respective processor. Once this has been done, however, the dirty bit will not need to be set again, so that it will only be necessary to reload that page's entry into map cache 58 the first time a write is made to a processor cache entry in that page, but not when subsequent writes are made. The implementation of FIG. 9 takes advantage of these observations, and is accessed by a processor only when that processor attempts a write to an entry in its processor cache whose wtEnableΛDirty bit is cleared, and receives a signal from its processor cache that a write protect fault has occurred. The processor will then provide a virtual address in the bypass address range to access write protect fault handler 308.

Upon accessing write protect fault handler 308, the processor first retrieves the entry from map table 60 of the page which includes the processor cache entry, in box 386. This is done as in box 324 in FIG. 8. Since every processor cache entry must be based on a map table entry, however, a map table entry must be found.

The wtEnable bit of the retrieved map table entry is then tested in box 388. If it is clear, a write protection violation has occurred due to a program error, and a signal to that effect is provided in box 390. At this point an error recovery routine may be executed or other appropriate action may be taken, according to conventional techniques.

If the wtEnable bit is set, however, this is the first time that any of the processors have written to that page. Therefore, the dirty bit of the map table entry is set, in box 392. In addition, the entry is written to map cache 58 in its new form using a WriteEntry command, also described above, in box 394. Then, the wtEnableΛDirty bit in each of the processor cache entries from that page is set using a ChangeFlags command, in box 396, completing write protect fault handler 308. The processor returns from the routine and retries the write instruction in box 398.

The contents of bypass area 50 thus provide the software and map table which make it possible for map cache 58 to dramatically improve the speed of virtual address mapping.

5. Miscellaneous

A number of other features are desirable in implementing the invention. A routine for switching address spaces may be stored in bypass area 50 to be accessed by a processor in response to certain instructions. This routine need not flush map cache 58 since each entry contains its own AID, but must write a new AID into AID RAM 124 for that processor, using its processor number from master Pn register 120 with a WriteSpace command, discussed above. Also, ChangeFlags must be used to clear the VPValid bits of all the entries in that processor's cache, so that when that processor sends a virtual address, the processor cache will be sure to miss, and will send the virtual address on to map cache 58 for translation.

Bypass area 50, in addition to its other roles, may be used during initialization. For example, when the system is first powered on, map cache 58 may automatically load default values into bypass logic 136. One of the processors may then begin executing a boot routine from a boot ROM accessible using those default values or from a short routine automatically loaded into an area of main memory 48 accessible using those default values. The boot routine may then be used to load the actual bypass values into bypass logic 136 to obtain the appropriate bypass area size and location.

The present invention may be used with the invention described in the copending coassigned U.S. patent application Ser. No. 929,544, now abandoned, incorporated herein by reference, in which case map cache 58 will be connected to the same bus as the processor caches.

Many other modifications, variations and improvements will be apparent to those skilled in the art from the above description, the drawings and the attached claims. The scope of the invention is not limited to the embodiments described and shown, but only by the attached claims.

What is claimed:

1. A system comprising:
   a memory accessible with any of a set of real addresses;
   a plurality of processors, each of the plurality of processors requesting access to the memory by providing virtual addresses from a set of virtual addresses; each of the plurality of processors providing virtual addresses in one of a plurality of address spaces;
   a bus connected for receiving virtual addresses provided by each of the plurality of processors and for providing any of the set of real addresses to access the memory; each virtual address received by the bus being from the set of virtual addresses; and
   an address translator for translating virtual addresses provided by each of the plurality of processors to respective real addresses from the set of real addresses, the address translator being connected for receiving virtual addresses provided by each of the plurality of processors from the bus and for providing, for each virtual address, the respective real address on the bus; each virtual address received by the address translator being from the set of virtual addresses; the address translator comprising circuitry for obtaining, for a received virtual address, an address space identifier identifying one of the plurality of address spaces and for using the address space identifier and the received virtual address to obtain a respective real address for the received virtual address.

2. The system of claim 1, further comprising, for each of the plurality of processors, a respective cache connected between the processor and the bus; the cache storing respective data for each of a subset of the set of virtual addresses; the cache receiving the virtual address from the processor and providing the respective data in response to the virtual address if the virtual address is in the subset of virtual addresses; the cache further determining whether to provide the virtual address on the bus if the virtual address is not in the subset of virtual addresses.

3. The system of claim 2 in which the cache further receives the respective real address provided by the address translator from the bus and provides the respective real address on the bus to access the memory.

4. A system comprising:
   a memory accessible with any of a set of real addresses;
   a plurality of processors, each of the plurality of processors requesting access to the memory by providing virtual addresses from a set of virtual addresses; each of the processors providing virtual addresses in one of a plurality of address spaces;

a bus connected for receiving virtual addresses provided by each of the plurality of processors and for providing any of the set of real addresses to access the memory; each virtual address received by the bus being from the set of virtual addresses;

for each of the plurality of processors, a respective cache connected between the processor and the bus; the cache storing respective data for each of a subset of the set of virtual addresses; the cache receiving the virtual address from the processor and providing the respective data in response to the virtual address if the virtual address is in the subset of virtual addresses; the cache further determining whether to provide the virtual address on the bus if the virtual address is not in the subset of virtual addresses; and an address translator for translating virtual addresses provided by the respective cache of each of the plurality of processors to respective real addresses from the set of real addresses, the address translator being connected for receiving virtual addresses provided by the respective cache of each of the plurality of processors from the bus and for providing, for each virtual address, the respective real address on the bus; each virtual address received by the address translator being from the set of virtual addresses; the address translator comprising circuitry for obtaining, for a received virtual address, an address space identifier identifying one of the plurality of address spaces and for using the address space identifier and the received virtual address to obtain a respective real address for the received virtual address.

5. A system comprising:

a memory accessible with any of a set of real addresses;

a plurality of processors, each of the plurality of processors requesting access to the memory by providing virtual addresses from a set of virtual addresses; each of the plurality of processors providing virtual addresses in one of a plurality of address spaces;

a bus connected for receiving virtual addresses provided by each of the plurality of processors and for providing any of the set of real addresses to access the memory; each virtual address received by the bus being from the set of virtual addresses; and an address translator for translating virtual addresses provided by each of the plurality of processors to respective real addresses from the set of real addresses, the address translator being connected for receiving virtual addresses provided by each of the plurality of processors from the bus and for providing, for each virtual address, the respective real address on the bus; each virtual address received by the address translator being from the set of virtual addresses; the address translator comprising circuitry for obtaining, for a received virtual address, an address space identifier identifying one of the plurality of address spaces and for using the address space identifier and the received virtual address to obtain a respective real address for the received virtual address;

the memory including a paged area and a map table with a plurality of entries, each map table entry associating a respective one of the set of virtual addresses with a respective one of the set of real addresses that accesses a page in the paged area; the address translator comprising a map cache with a plurality of cache entries, the plurality of cache entries including data indicating information from a subset of the plurality of map table entries.

6. The system of claim 5 in which each map table entry and each map cache entry further associates the respective virtual address and a respective address space identifier with the respective real address; upon receiving a virtual address from one of the plurality of processors, the circuitry in the address translator obtaining an address space identifier identifying one of the plurality of address spaces and using the address space identifier in translating the virtual address provided by the processor to the respective real address.

7. The system of claim 5 in which the address translator further provides a signal indicating a map cache miss if a virtual address provided by one of the plurality of processors is not associated with the respective real address by any of the map cache entries; the memory further including software for servicing a map cache miss, the software being executed in response to the map cache miss.

8. The system of claim 7 in which the one of the plurality of processors that provided the virtual address responds to the map cache miss by executing the software for servicing a map cache miss.

9. The system of claim 7 in which the software for servicing a map cache miss, when executed, loads an entry including data indicating information from one of the map table entries into the map cache.

10. The system of claim 9 in which the map cache is a pure cache.

* * * * *